United States Patent
Liu

(10) Patent No.: US 11,431,450 B2
(45) Date of Patent: Aug. 30, 2022

(54) CHANNEL STATE INFORMATION REFERENCE SIGNAL TRANSMISSION

(71) Applicant: Qualcomm Incorporated, San Diego, CA (US)

(72) Inventor: Xiaohui Liu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 768 days.

(21) Appl. No.: 16/079,492

(22) PCT Filed: Mar. 17, 2017

(86) PCT No.: PCT/CN2017/077077
§ 371 (c)(1),
(2) Date: Aug. 23, 2018

(87) PCT Pub. No.: WO2017/162106
PCT Pub. Date: Sep. 28, 2017

(65) Prior Publication Data
US 2021/0273758 A1    Sep. 2, 2021

(30) Foreign Application Priority Data
Mar. 25, 2016  (WO) ................ PCT/CN2016/077404

(51) Int. Cl.
*H04L 5/00* (2006.01)
*H04B 7/06* (2006.01)
*H04L 25/02* (2006.01)

(52) U.S. Cl.
CPC ......... *H04L 5/0048* (2013.01); *H04B 7/0608* (2013.01); *H04L 25/0224* (2013.01)

(58) Field of Classification Search
CPC .. H04L 5/0048; H04L 25/0224; H04B 7/0608
See application file for complete search history.

(56) References Cited

U.S. PATENT DOCUMENTS

| | | | |
|---|---|---|---|
| 8,825,069 B2 | 9/2014 | Koivisto et al. | |
| 2008/0063116 A1* | 3/2008 | Yokoyama | H04B 7/0632 375/299 |

(Continued)

FOREIGN PATENT DOCUMENTS

| | | |
|---|---|---|
| CN | 1878022 A | 12/2006 |
| CN | 101719883 A | 6/2010 |

(Continued)

OTHER PUBLICATIONS

Lamahewa et al. "A Framework to Calculate Space-Frequency Correlation in Multi-Carrier Systems", Jun. 2010, IEEE, IEEE Transactions on Wireless Communications, vol. 9, No. 6, Jun. 2010, pp. 1825-1831, pp. 7 (Year: 2010).*

(Continued)

*Primary Examiner* — Shah M Rahman
(74) *Attorney, Agent, or Firm* — QUALCOMM Incorporated

(57) ABSTRACT

Methods, systems, and devices for wireless communication are described. A base station may determine a mapping configuration for antenna ports that includes mapping antenna ports with high spatial correlation to frequency resource and mapping antenna ports with low spatial correlation to time resources. The base station may apply a common coding mechanism to channel state information reference signals (CSI-RSs) having a timing domain and transmit the CSI-RSs using antenna ports with high frequency separation. A user equipment (UE) may receive the CSI-RS on the channel and identify a joint correlation metric based on a frequency correlation and a spatial correlation between CSI-RS and the channel. The UE may determine a channel estimate for the channel based on the joint correlation metric.

56 Claims, 18 Drawing Sheets

(56) References Cited

U.S. PATENT DOCUMENTS

| | | | |
|---|---|---|---|
| 2011/0205930 A1 | 8/2011 | Rahman et al. | |
| 2011/0306371 A1 | 12/2011 | Kitahara | |
| 2012/0213261 A1* | 8/2012 | Sayana | H04L 5/0094 375/224 |
| 2013/0044610 A1* | 2/2013 | Zhao | H04L 27/2647 370/252 |
| 2013/0051489 A1* | 2/2013 | Singh | H04L 25/0224 375/295 |
| 2013/0286880 A1* | 10/2013 | Lee | H04B 7/066 370/252 |
| 2013/0301434 A1* | 11/2013 | Krishnamurthy | H04B 7/0456 370/252 |
| 2013/0301563 A1 | 11/2013 | Gupta et al. | |
| 2013/0329649 A1 | 12/2013 | Wernersson et al. | |
| 2014/0029696 A1* | 1/2014 | Yoon | H04L 5/0073 375/299 |
| 2014/0044207 A1 | 2/2014 | Han | |
| 2014/0286182 A1* | 9/2014 | Chen | H04L 1/0026 370/252 |
| 2014/0301492 A1 | 10/2014 | Xin et al. | |
| 2014/0341048 A1* | 11/2014 | Sajadieh | H04W 36/0011 370/252 |
| 2015/0049683 A1* | 2/2015 | Barbieri | H04L 5/0073 370/329 |
| 2015/0131565 A1 | 5/2015 | Nakashima et al. | |
| 2015/0333885 A1* | 11/2015 | Athley | H04B 7/0658 375/219 |
| 2015/0341152 A1* | 11/2015 | Kim | H04L 5/0048 370/329 |
| 2015/0373736 A1 | 12/2015 | Ji et al. | |
| 2016/0013905 A1* | 1/2016 | Seo | H04B 7/0456 370/329 |
| 2016/0037550 A1* | 2/2016 | Barabell | H04W 72/046 455/450 |
| 2016/0248562 A1* | 8/2016 | Nam | H04L 5/0051 |
| 2016/0352402 A1* | 12/2016 | Park | H04B 7/0413 |
| 2016/0380734 A1* | 12/2016 | Wang | H04B 7/0456 370/329 |
| 2017/0041113 A1* | 2/2017 | Park | H04L 5/0057 |
| 2017/0170935 A1* | 6/2017 | Bengtsson | H04B 7/0404 |
| 2019/0028913 A1* | 1/2019 | Park | H04B 7/0691 |
| 2019/0319682 A1* | 10/2019 | Zhang | H04B 7/0417 |

FOREIGN PATENT DOCUMENTS

| | | |
|---|---|---|
| CN | 102088309 A | 6/2011 |
| CN | 102273091 A | 12/2011 |
| CN | 102594739 A | 7/2012 |
| CN | 104184537 A | 12/2014 |
| WO | WO 2012093333 A1 | 7/2012 |
| WO | WO 2015131378 A1 | 9/2015 |

OTHER PUBLICATIONS

Domene et al., "A limited feedback scheme based on spatially correlated channels for coordinated multipoint systems", 2012, EURASIP Journal on Wireless Communications and Networking 2012, 2012:176, pp. 15 (Year: 2012).*

CATT: "Discussion on Standard-transparent Baseline Schemes for EBF/FD-MIMO Comparison," 3GPP TSG RAN WG1 Meeting #79, R1-144630, Nov. 17-21, 2014, 4 pages.

Mediatek Inc., "Discussion on DL CoMP RI Tests", 3GPP TSG-RAN WG4 Meeting #68bis, R4-135174, Riga, Latvia, Oct. 7-11, 2013, 12 pages.

Supplementary European Search Report—EP17769383—Search Authority—The Hague—dated Oct. 16, 2019.

International Search Report and Written Opinion—PCT/CN2016/077404—ISA/EPO—dated Dec. 21, 2016.

International Search Report and Written Opinion—PCT/CN2017/077077—ISA/EPO—dated Jun. 21, 2017.

Pan P-S., et al., "Channel Estimation in Space and Frequency Domain for MIMO-OFDM systems", The Journal of China Universities of Posts and Telecommunications, Jun. 30, 2009, pp. 41-44.

Yuan et al., "Channel Estimation in Space and Frequency Domain for MIMO-OFDM Systems," Chinese Journal of Electron Devices, Oct. 2010, 1005-9490, vol. 33, No. 5, pp. 595-598 (English translation of abstract).

* cited by examiner

CHANNEL STATE INFORMATION REFERENCE SIGNAL TRANSMISSION

CROSS REFERENCES

The present application is a 371 national phase filing on International Application No. PCT/CN2017/077077 to Liu, entitled "CHANNEL STATE INFORMATION REFERENCE SIGNAL TRANSMISSION", filed Mar. 17, 2017, which claims priority to International Patent Application No. PCT/CN2016/077404 to Liu, titled "CHANNEL STATE INFORMATION REFERENCE SIGNAL TRANSMISSION", filed Mar. 25, 2016.

BACKGROUND

The following relates generally to wireless communication, and more specifically to channel state information reference signal transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless communication systems typically use reference signal transmissions for various purposes. One example reference signal includes a channel state information reference signal (CSI-RS) transmitted from the base station to UEs. The CSI-RS is used for channel estimation by the UE. Base stations and/or UEs may have more than one antenna port and the CSI-RS may be transmitted on each antenna port. Transmission of the CSI-RSs use valuable time/frequency resources and conventional techniques may use a CSI-RS density of one resource element (RE) per antenna port for each transmitted physical resource block (PRB), for a 1, 2, 4, or 8 antenna port configuration (e.g., an antenna port index of 1, 2, 4, or 8). However, advanced wireless communication systems may use even more transmission antennas, e.g., 16 ports, 32 ports, 64 ports, and even more, and therefore CSI-RS design becomes more complicated. For example, there is trade-off between adequate channel estimation and feedback provided by the CSI-RSs and with overhead required to transmit the CSI-RSs.

SUMMARY

The described techniques relate to improved methods, systems, apparatuses, or devices that support CSI-RS design and transmission. Generally, the described techniques provide for a base station to use antenna port mapping, common coding, or both techniques to improve CSI-RS transmission to support channel estimation in a system that uses an increased number of antenna ports, e.g., a multiple-input/multiple-output (MIMO) system that uses 32, 64, or even more antenna ports. In one example, the base station may determine a mapping configuration for the antenna ports that maps antenna ports with spatial correlation above a threshold to frequency resources and antenna ports with spatial correlation below the threshold to time resources. Additionally or alternatively, the base station may, for CSI-RSs having a common timing domain feature, apply a common coding mechanism to the CSI-RSs before transmission, e.g., a discrete Fourier transform (DFT) code or a Walsh code. The base station may transmit the CSI-RSs according to the mapping configuration. When utilized, the base station may transmit the CSI-RSs with the applied coding in the common timing domain and via antenna ports having a threshold amount of frequency separation.

At the UE side, the UE may receive a CSI-RS from the base station and utilize a joint correlation metric to determine the channel estimate. The joint correlation metric for the CSI-RS may include or be based on a frequency correlation and a spatial correlation of the channel. The UE may receive multiple CSI-RSs from the base station and perform joint processing on the CSI-RSs to determine the joint correlation metric. The joint processing may provide additional processing gain in the spatial domain, e.g., in a massive MIMO system with 16+ antenna ports that use the described antenna port mapping configurations. In some aspects, joint processing may include processing of all CSI-RSs received in a PRB and, in some examples, across multiple PRBs.

A method of wireless communication is described. The method may include receiving a CSI-RS from a transmitting device, identifying a joint correlation metric for a channel associated with the CSI-RS, the joint correlation metric based at least in part on a frequency correlation and a spatial correlation of the channel and determining a channel estimate for the channel based on the joint correlation metric.

An apparatus for wireless communication is described. The apparatus may include means for receiving a CSI-RS from a transmitting device, means for identifying a joint correlation metric for a channel associated with the CSI-RS, the joint correlation metric based at least in part on a frequency correlation and a spatial correlation of the channel and means for determining a channel estimate for the channel based on the joint correlation metric.

A further apparatus is described. The apparatus may include a processor, memory in electronic communication with the processor, and instructions stored in the memory. The instructions may be operable to cause the processor to receive a CSI-RS from a transmitting device, identify a joint correlation metric for a channel associated with the CSI-RS, the joint correlation metric based at least in part on a frequency correlation and a spatial correlation of the channel and determine a channel estimate for the channel based on the joint correlation metric.

A non-transitory computer readable medium for wireless communication is described. The non-transitory computer-readable medium may include instructions to cause a processor to receive a CSI-RS from a transmitting device, identify a joint correlation metric for a channel associated with the CSI-RS, the joint correlation metric based on a frequency correlation and a spatial correlation of the channel and determine a channel estimate for the channel based on the joint correlation metric.

In some examples of the method, apparatus, or non-transitory computer-readable medium described above, determining the channel estimate comprises: performing joint processing on a set of CSI-RS's received across a set of antenna ports. In some examples of the method, apparatus, or non-transitory computer-readable medium described above, the joint processing is performed across a set of resource block (RB)s.

In some examples of the method, apparatus, or non-transitory computer-readable medium described above, the joint processing comprises: identifying the joint correlation metric based on a set of CSI-RS's, a reference signal (e.g., non-CSI-RS reference signal(s)), or combinations thereof.

A method of wireless communication is described. The method may include determining a mapping configuration associated with a plurality of antenna ports, the mapping configuration comprising a first mapping of a first set of antenna ports with at least a first threshold amount of spatial correlation to frequency resources and a second mapping of a second set of antenna ports with less than the first threshold amount of spatial correlation to time resources and transmitting a plurality of CSI-RS's using the plurality of antenna ports and according to the mapping configuration.

An apparatus for wireless communication is described. The apparatus may include means for determining a mapping configuration associated with a plurality of antenna ports, the mapping configuration comprising a first mapping of a first set of antenna ports with at least a first threshold amount of spatial correlation to frequency resources and a second mapping of a second set of antenna ports with less than the first threshold amount of spatial correlation to time resources and means for transmitting a plurality of CSI-RS's using the plurality of antenna ports and according to the mapping configuration.

A further apparatus is described. The apparatus may include a processor, memory in electronic communication with the processor, and instructions stored in the memory. The instructions may be operable to cause the processor to determine a mapping configuration associated with a plurality of antenna ports, the mapping configuration comprising a first mapping of a first set of antenna ports with at least a first threshold amount of spatial correlation to frequency resources and a second mapping of a second set of antenna ports with less than the first threshold amount of spatial correlation to time resources and transmit a plurality of CSI-RS's using the plurality of antenna ports and according to the mapping configuration.

A non-transitory computer readable medium for wireless communication is described. The non-transitory computer-readable medium may include instructions to cause a processor to determine a mapping configuration associated with a set of antenna ports, the mapping configuration comprising a first mapping of a first set of antenna ports with at least a first threshold amount of spatial correlation to frequency resources and a second mapping of a second set of antenna ports with less than the first threshold amount of spatial correlation to time resources and transmit a set of CSI-RS's using the set of antenna ports and according to the mapping configuration.

In some examples of the method, apparatus, or non-transitory computer-readable medium described above, mapping the antenna ports comprises: mapping antenna ports with at least the first threshold amount of spatial correlation to resources with less than a second threshold amount of frequency correlation. Some examples of the method, apparatus, or non-transitory computer-readable medium described above may further include processes, features, means, or instructions for mapping antenna ports with less than the first threshold amount of spatial correlation to resources with greater than the second threshold amount of frequency correlation.

Some examples of the method, apparatus, or non-transitory computer-readable medium described above may further include processes, features, means, or instructions for assigning at least a portion of the antenna ports of the first set or the second set of antenna ports to frequencies separated within a predefined range, the assigning based on a frequency correlation associated with the at least a portion of the antenna ports, the frequency correlation being less than the second threshold amount.

Some examples of the method, apparatus, or non-transitory computer-readable medium described above may further include processes, features, means, or instructions for assigning at least a portion of the antenna ports of the first set or the second set of antenna ports to frequencies separated outside a predefined range, the assigning based on a frequency correlation associated with the at least a portion of the antenna ports, the frequency correlation being greater than the second threshold amount.

Some examples of the method, apparatus, or non-transitory computer-readable medium described above may further include processes, features, means, or instructions for applying a coding mechanism to at least a portion of the CSI-RS's prior to transmission. Some examples of the method, apparatus, or non-transitory computer-readable medium described above may further include processes, features, means, or instructions for mapping the coded portion of the CSI-RS's for transmission on antenna ports with low spatial correlation.

In some examples of the method, apparatus, or non-transitory computer-readable medium described above, the coding mechanism is applied in a time domain resource, a frequency domain resource, or combinations thereof. In some examples of the method, apparatus, or non-transitory computer-readable medium described above, the antenna ports with low spatial correlation are cross-polarized antenna ports.

In some examples of the method, apparatus, or non-transitory computer-readable medium described above, mapping the antenna ports comprises: mapping cross-polarized antenna ports to adjacent time domain symbols. Some examples of the method, apparatus, or non-transitory computer-readable medium described above may further include processes, features, means, or instructions for mapping co-polarized antenna ports to adjacent frequency domain symbols.

A method of wireless communication is described. The method may include identifying a set of CSI-RS's having a common timing domain, applying a common coding mechanism to the set of CSI-RS's and transmitting the set of CSI-RS's in the common timing domain and according to a multiplexing technique, the set of CSI-RS's transmitted using a set of antenna ports having a threshold amount of frequency spacing.

An apparatus for wireless communication is described. The apparatus may include means for identifying a set of CSI-RS's having a common timing domain, means for applying a common coding mechanism to the set of CSI-RS's and means for transmitting the set of CSI-RS's in the common timing domain and according to a multiplexing technique, the set of CSI-RS's transmitted using a set of antenna ports having a threshold amount of frequency spacing.

A further apparatus is described. The apparatus may include a processor, memory in electronic communication with the processor, and instructions stored in the memory. The instructions may be operable to cause the processor to identify a set of CSI-RS's having a common timing domain, apply a common coding mechanism to the set of CSI-RS's and transmit the set of CSI-RS's in the common timing domain and according to a multiplexing technique, the set of CSI-RS's transmitted using a set of antenna ports having a threshold amount of frequency spacing.

A non-transitory computer readable medium for wireless communication is described. The non-transitory computer-readable medium may include instructions to cause a processor to identify a set of CSI-RS's having a common timing domain, apply a common coding mechanism to the set of CSI-RS's and transmit the set of CSI-RS's in the common timing domain and according to a multiplexing technique, the set of CSI-RS's transmitted using a set of antenna ports having a threshold amount of frequency spacing.

In some examples of the method, apparatus, or non-transitory computer-readable medium described above, the common coding mechanism comprises at least one of a DFT code or a Walsh code.

In some examples of the method, apparatus, or non-transitory computer-readable medium described above, the multiplexing technique comprises a time division multiplexing (TDM) technique, a frequency division multiplexing (FDM) technique, or combinations thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
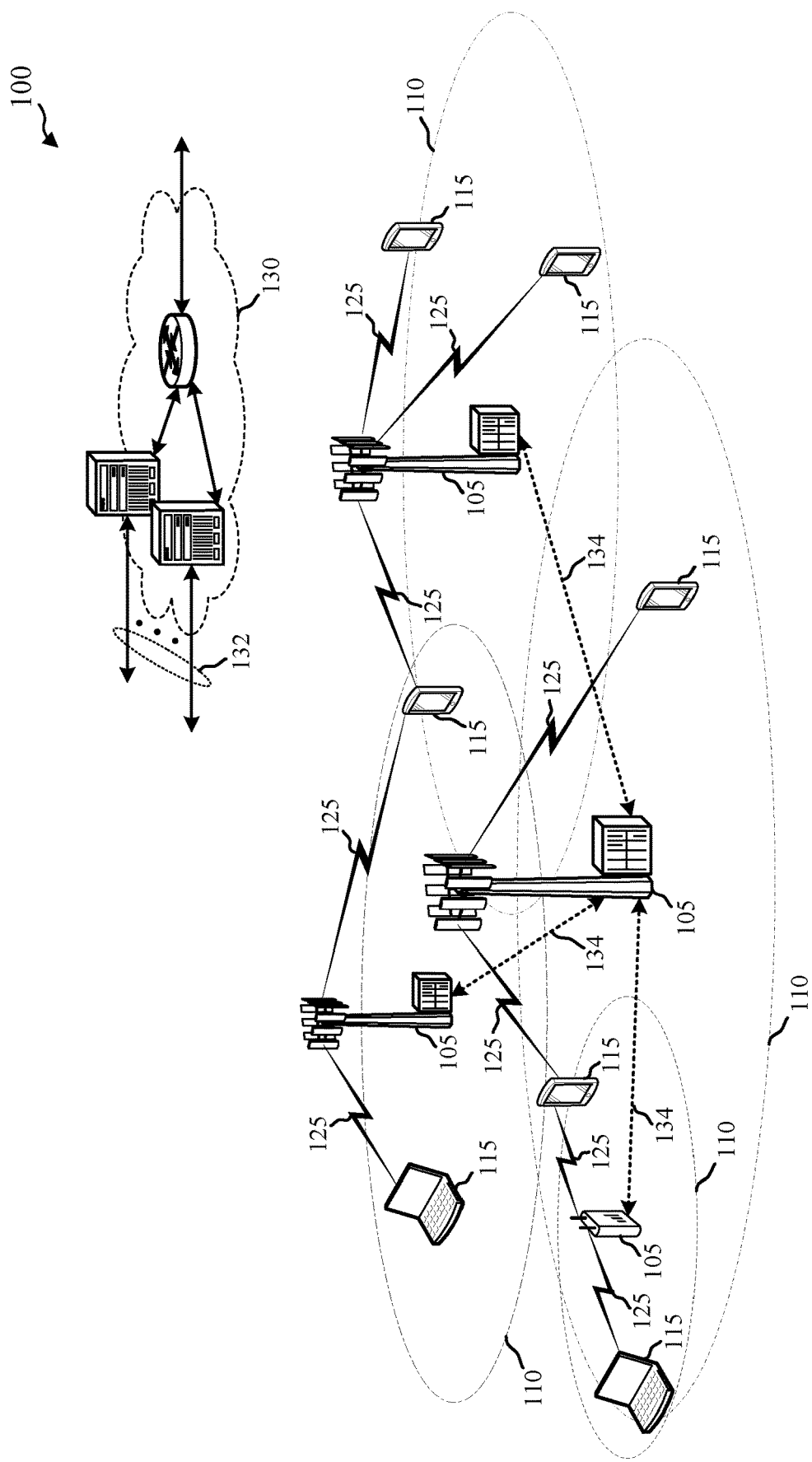
FIG. 1 illustrates an example of a wireless communications system that supports channel state information reference signal transmission in accordance with aspects of the present disclosure.

Channel state information reference signals (CSI-RSs) are transmitted from the base station to a user equipment (UE) over the physical layer channel (e.g., a particular frequency). The UE measures the received CSI-RS and determines the condition of the channel, e.g., a channel quality indicator (CQI), signal-to-noise ratio (SNR), etc. The CSI-RS cost in current configurations is generally one resource element (RE) for each transmission antenna port per physical resource block (PRB), with a typical PRB having 75-85 REs available. While this cost may be minimal for conventional antenna configurations consisting of up to 8 antenna ports, the cost increases dramatically for advanced wireless communication systems that may include 16, 32, 64, or more antenna ports.

Aspects of the present disclosure are initially described in the context of a wireless communication system. In some examples, a base station may have a large number of antenna ports, e.g., more than eight antenna ports, available for transmission of CSI-RSs. The base station may use the described techniques for optimization of CSI-RS transmission across the large number of antenna ports. In one example, the base station may use a mapping configuration for CSI-RS transmission across the antenna ports. The mapping configuration may be determined for the antenna ports and may include two sets of antenna ports. The first set of antenna ports may have high spatial correlation (e.g., spatial correlation above a threshold) and be mapped to frequency resources. The second set of antenna ports may have low spatial correlation (e.g., spatial correlation below the threshold) and be mapped to time resources. As one non-limiting example, cross-polarized antenna ports may be mapped to adjacent time domain symbols and co-polarized antenna ports may be mapped to adjacent frequency domain symbols.

Additionally or alternatively, the base station may apply an orthogonal cover code to some or all of the CSI-RSs before transmission. For example, the base station may identify a set of CSI-RSs being transmitted in the same or common time domain. The base station may apply the common coding mechanism to the set of CSI-RSs, e.g., discrete Fourier transform (DFT) code or Walsh code. The base station may identify antenna ports with high frequency separation (e.g., frequency spacing above a threshold amount) and transmit the set of CSI-RSs using a multiplexing technique.

At the receiving side, a UE (for example) may receive a CSI-RS on a channel from the base station and use a joint correlation metric to determine a channel estimate for the channel. For example, the UE may identify the joint correlation metric for the channel that the CSI-RS is received on. The joint correlation metric may be based on a frequency correlation and a spatial correlation of channel response observed by multiple CSI-RS or other reference signals. The UE may perform joint processing across multiple receive antenna ports and/or across multiple PRBs to determine the channel estimate.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. In some examples, the wireless communications system 100 may support multiple-input/multiple-output (MIMO) techniques using a large number of antenna ports, e.g., greater than 8 antenna ports at a base station 105.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may gather channel condition information from a UE 115 in order to efficiently configure and schedule the channel. This information may be sent from the UE 115 in the form of a channel state report or channel estimate information. A channel state report may contain an rank indicator (RI) requesting a number of layers to be used for DL transmissions (e.g., based on the antenna ports of the UE 115), a precoding matrix indicator (PMI) indicating a preference for which precoder matrix should be used (based on the number of layers), and a channel quality indicator (CQI) representing the highest modulation and coding scheme (MCS) that may be used. CQI may be calculated by a UE 115 after receiving predetermined pilot symbols such as cell-specific reference signals (CRS) or CSI-RS. RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best sub-bands, or configured reports in which the sub-bands reported are selected by the base station 105.

A UF 115 may be configured to collaboratively communicate with multiple eNBs 105 through, for example, MIMO, Coordinated Multi-Point (CoMP), or other schemes. MIMO techniques use multiple antennas on the base stations or multiple antennas on the UE 115 to take advantage of multipath environments to transmit multiple data streams. In some aspects, the base stations 105 or UE 115 may have a large amount of transmission antennas, e.g., 16 antenna ports or more. CoMP includes techniques for dynamic coordination of transmission and reception by a number of base stations 105 to improve overall transmission quality for UEs 115 as well as increasing network and spectrum utilization.

In some cases, wireless communications system 100 may utilize one or more enhanced component carriers (eCCs). An eCC may be characterized by one or more features including: flexible bandwidth, different transmission time intervals (TTI), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum).

An eCC characterized by flexible bandwidth may include one or more segments that may be utilized by UEs 115 that are not capable of monitoring the whole bandwidth or prefer to use a limited bandwidth (e.g., to conserve power). In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions).

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARQ) related control information.

Wireless communications system 100 may support aspects of the described CSI-RS transmission. For example, a base station 105 may determine a mapping configuration for a plurality of antenna ports. The mapping configuration may include one set of antenna ports with high spatial correlation (e.g., spatial correlation above a threshold) to frequency resources. The mapping configuration may include another set of antenna ports with low spatial correlation (e.g., spatial correlation below the threshold) to time resources. The base station 105 may transmit the CSI-RSs using the sets of antenna ports and according to the mapping configuration.

Additionally or alternatively, the base station 105 may identify a set of CSI-RSs having a common timing domain feature. The base station 105 may apply a common coding mechanism to the set of CSI-RSs and transmit the set of CSI-RSs in the common timing domain and according to a multiplexing technique. The set of CSI-RSs may be transmitted using antenna ports with high frequency spacing (e.g., above a threshold).

At UE 115 may support the described mapping configuration and/or common coding mechanism techniques for improved CSI-RS processing. For example, the UE 115 may receive the CSI-RSs transmitted by base station 105 and identify a joint correlation metric for a channel associated with the CSI-RS. The joint correlation metric may be based on a spatial correlation and a frequency correlation of the CSI-RS. The UE 115 may determine a channel estimate for the channel based on the joint correlation metric. In some examples, UE 115 may perform joint processing on multiple received CSI-RSs.

Figure 2:
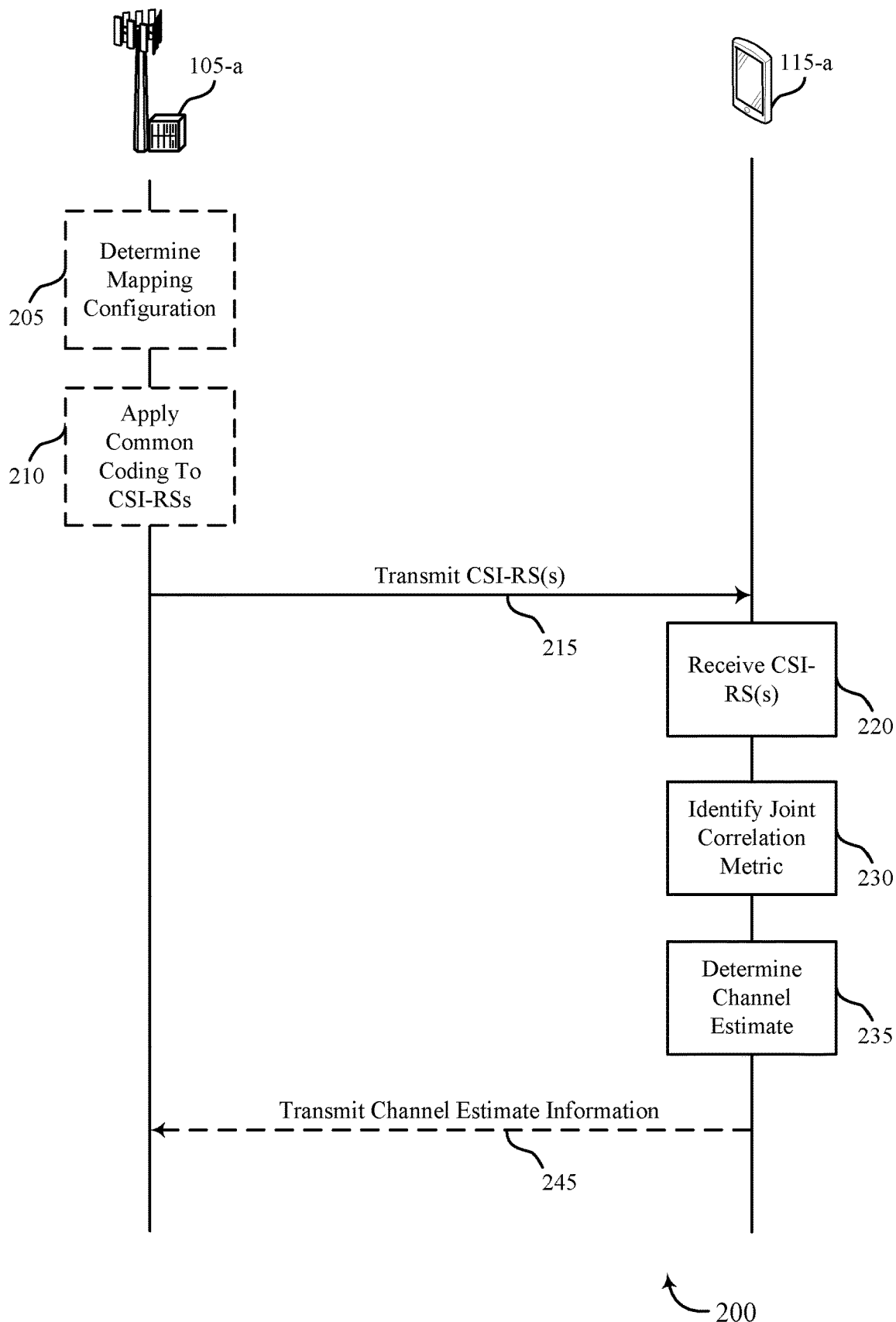
FIG. 2 illustrates an example of process flow in a wireless communications system that supports channel state information reference signal transmission in accordance with aspects of the present disclosure.

FIG. 2 shows a process flow 200 in a wireless communication system that supports CSI-RS transmission, in accordance with various aspects of the present disclosure. Process flow 200 may include a base station 105-*a* and a UE 115-*a*, which may be examples of the corresponding devices described with reference to FIG. 1. Generally, process flow 200 illustrates an example of UE 115-*a* employing joint processing techniques for CSI-RSs received from base station 105-*a* based on a joint correlation metric to determine a channel estimate.

At 205, base station 105-*a* may optionally determine a mapping configuration for antenna ports transmitting CSI-RSs to the UE 115-*a*. More particular details of the mapping configuration will be described with reference to FIGS. 3 and 4.

At 210, base station 105-*a* may optionally apply a common coding mechanism to the CSI-RSs transmitted to the UE 115-*a* in a common timing domain. More particular details of the common coding mechanism will be described with reference to FIG. 5.

At 215, base station 105-*a* may transmit a CSI-RS to UE 115-*a*. In some aspects, base station 105-*a* may transmit multiple CSI-RSs to the UE 115-*a* according to the mapping configuration determined at 205. In some aspects, at least a portion of the CSI-RSs may have a common coding mechanism applied, e.g., those with a common timing domain feature. The base station 105-*a* may transmit the CSI-RS using an antenna port across the physical layer. The (or each) CSI-RS may be transmitted in RE of a PRB or a sub-frame.

At 220, UE 115-*a* may receive the CSI-RS(s) from base station 105-*a*. UE 115-*a* may receive the CSI-RS on one receive antenna port or on multiple antenna ports. Receiving the CSI-RS(s) may include UE 115-*a* measuring a signal strength of the CSI-RS. When the CSI-RS is received on multiple receive antenna ports. UE 115-*a* may measure the signal strength of the CSI-RS at each receive antenna ports.

Receiving the CSI-RS(s) may include receiving multiple CSI-RSs from base station 105-*a*, e.g., CSI-RSs transmitted from different antenna ports of base station 105-*a*. Receiving the CSI-RS(s) may include receiving CSI-RSs from base station 105-*a* across multiple PRBs.

At 230, UE 115-*a* may identify a joint correlation metric for a channel associated with the received CSI-RS. The joint correlation metric may be based on a frequency correlation and a spatial correlation of the channel. At 235, UE 115-*a* may determine a channel estimate for the channel based on the joint correlation metric. The frequency correlation and spatial correlation may be considered a measure of the similarities or likeness of the frequency and spatial domain, respectively, of the channel.

In some aspects, UE 115-*a* may perform joint processing to determine the channel estimate. The joint processing may be performed on a plurality of CSI-RSs received on multiple receive antenna ports. The joint processing may be performed across a plurality of PRBs. The joint correlation metric may be identified based on the plurality of CSI-RSs.

In some aspects, determining a channel estimate may include the UE 115-*a* refraining from per-port processing of the received CSI-RS using an assumption of independence across all CSI-RS antenna ports (also referred to as baseline processing). Instead, UE 115-*a* may use joint processing to obtain additional processing gain in the spatial domain, e.g., in a MIMO system that utilizes a large number of transmission antenna ports with high correlation across co-polarized transmission antenna ports.

In some aspects, an example CSI-RS signal model may be used that does not exploit spatial correlation at UE 115-*a* due to the low correlation assumption in general. The CSI-RS signal model may assume P transmission antenna ports and 1 receiving antenna port and be $Y=\Sigma_i^{P-1} X_i H_i + N$, where Y is the received signal, $X_i$ and $H_i$ denote the CSI-RS and its corresponding Channel Frequency Response (CFR) for port $i \in [0, P)$, and N is additive white gausian noise (AWGN). Using similar polarization assumptions and index number based on the number of transmission antenna ports, an effective spatial channel correlation matrix can be expressed as $R = R_S \otimes R_T \otimes R_F$, where $R_S$, $R_T$ and $R_F$ are defined as channel correlation matrix in spatial, temporal and frequency domains, respectively. $R_T$ may be assumed as depending on maximum Doppler spread and $R_F$ based on the Power Delay Profile (PDP) of a multi-path channel. This may result in a spatial channel correlation matrix of $R_S = D(R_X \otimes R_U)D^H$, where $$R_X = \begin{bmatrix} 1 & \gamma \\ \gamma^* & 1 \end{bmatrix}$$

is the correlation matrix between cross-polarized antenna ports.

$$R_U = \begin{bmatrix} 1 & \alpha^{i/\frac{P}{2}-1} & \cdots & \alpha \\ \alpha^{i/\frac{P}{2}-1*} & 1 & \alpha^{i/\frac{P}{2}-1} & \vdots \\ \vdots & \alpha^{i/\frac{P}{2}-1*} & 1 & \alpha^{i/\frac{P}{2}-1} \\ \alpha^* & \cdots & \alpha^{i/\frac{P}{2}-1*} & 1 \end{bmatrix}$$

is the correlation matrix among co-polarized transmission antenna ports and $$D = \begin{bmatrix} 1 & 0 \\ 0 & 1 \end{bmatrix} \otimes \begin{bmatrix} 1 & 0 & \cdots & 0 \\ 0 & e^{j\theta} & 0 & \vdots \\ \vdots & 0 & \ddots & 0 \\ 0 & \cdots & 0 & e^{j\frac{P}{2}-1\theta} \end{bmatrix}$$

is a steering matrix to model the beam direction. $\gamma$, $\alpha \in [0,1]$ may be correlation factors and $\theta \in [0,2\pi]$ may control the phase, as is generally understood.

Conventionally, received CSI-RS signals are not processed across multiple subframes due to the low density in time domain. And within a subframe, channel estimation may be performed based on de-covered received signal of per-port CSI-RS separately, so the estimates, assuming minimum mean square error (MMSE), may be expressed as $\hat{H}_i = R_{F_d}(R_{F_p} + \sigma^2 I)^{-1} Y_i$, where $R_{F_d}$ and $R_{F_p}$ are respectively channel frequency cross-correlation and auto-correlation, $\sigma^2$ is the variance of AWGN, and $Y_i$ is the received signal for port i after de-covering.

In some aspects, the described joint processing techniques exploit the potential gain from more dimensions (e.g., the joint correlation metric based on the frequency correlation and the spatial correlation), by using joint CSI-RS processing as $\hat{H} = RX^H(XRX^H + \sigma^2 I)^{-1} Y$, where X is a diagonal matrix with CSI-RS of all receive antenna ports and Y is the received raw signal at CSI-RS receive antenna ports. The joint processing techniques may be applied across multiple PRBs, e.g., 2 PRBs, 4 PRBs, 8 PRBs, or some other number of PRBs.

At 245, UE 115-a may optionally transmit channel estimate information to base station 105-a. The channel estimate information may be determined at 235, for example, based on the received CSI-RS signals. The channel estimate information may include a CQI, SNR, etc., associated with the channel. Base station 105-a may use the channel estimate information for scheduling and configuration determinations for communications with UE 115-a.

Figure 3:
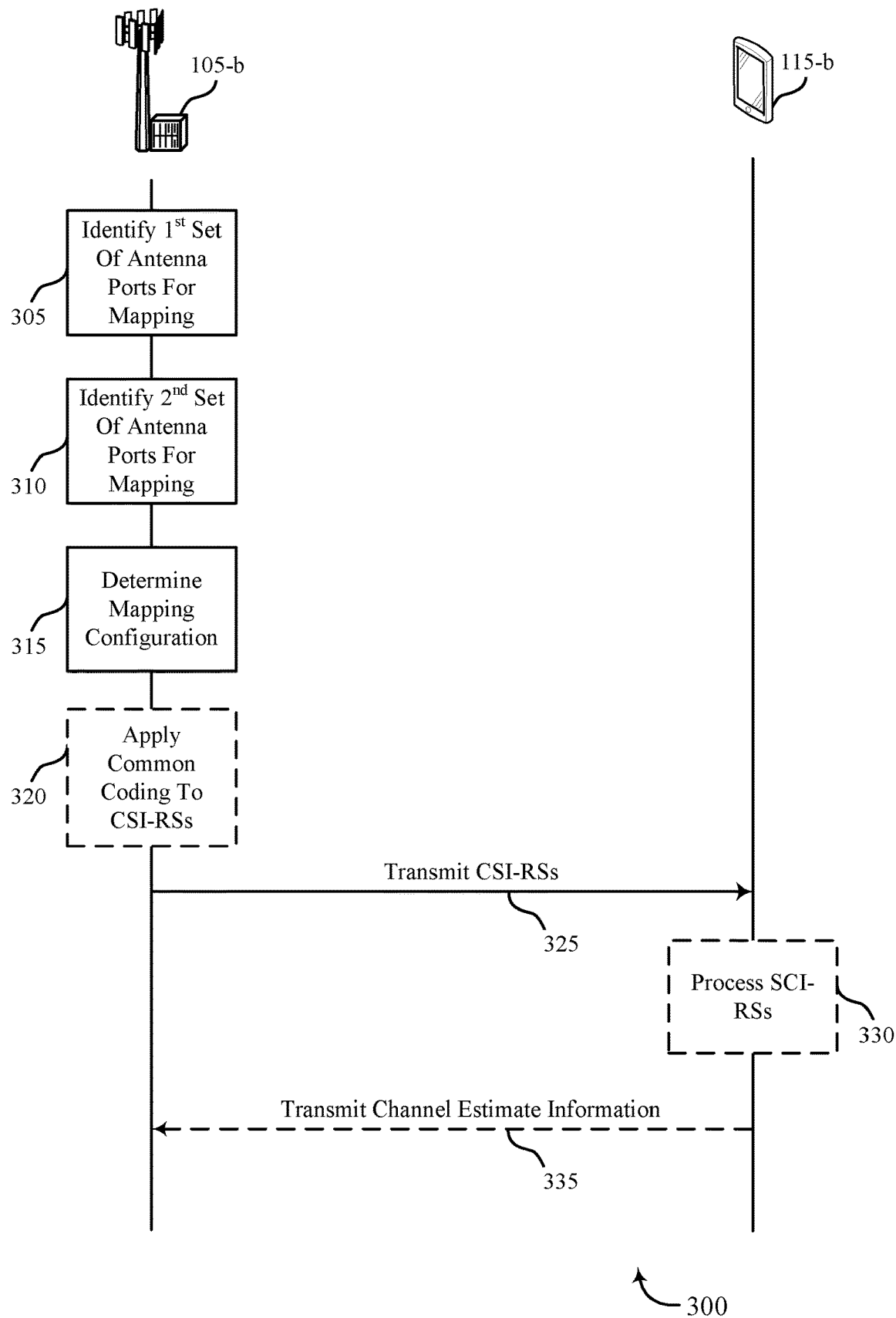
FIG. 3 illustrates an example of a process flow in a wireless communications system that supports channel state information reference signal transmission in accordance with aspects of the present disclosure.

FIG. 3 shows a process flow 300 in a wireless communication system that supports CSI-RS transmission, in accordance with various aspects of the present disclosure. Process flow 300 may include a base station 105-b and a UE 115-b, which may be examples of the corresponding devices described with reference to FIGS. 1 and 2. Generally, process flow 300 illustrates an example of base station 105-b determining a mapping configuration for a plurality of transmission antenna ports for CSI-RSs transmitted to UE 115-b. In some aspects, base station 105-b may be configured with a plurality of antenna ports. e.g., a large number of antenna ports in a massive MIMO system.

At 305, base station 105-b may identify a first set of antenna ports. The first set of antenna ports may be identified based on the antenna ports having high spatial correlation (e.g., above a threshold amount of spatial correlation). The first set of antenna ports may be identified for mapping to frequency resources, e.g., to different frequencies of a PRB for transmission.

At 310, base station 105-b may identify a second set of antenna ports. The second set of antenna ports may be identified based on the antenna ports having low spatial correlation (e.g., below the threshold amount of spatial correlation). The second set of antenna ports may be identified for mapping to time resources, e.g., to different transmission times of symbols of a PRB.

At 315, base station 105-b may determine a mapping configuration associated with the plurality of antenna ports. The mapping configuration may include the first set of antenna ports and the second set of antenna ports. In some aspects, the mapping configuration may include mapping antenna ports with high spatial correlation to low frequency correlation resources, e.g., the resources with frequency correlation below a threshold amount. In some aspects, the mapping configuration may include mapping antenna ports with low spatial correlation to high frequency correlation resources, e.g., the resources with frequency correlation above a threshold amount.

In some aspects, the mapping configuration may include base station 105-b mapping cross-polarized antenna ports to adjacent time domain symbols and mapping co-polarized antenna ports to adjacent frequency domain symbols.

In some aspects, the mapping configuration may include base station 105-b assigning a portion of the plurality of antenna ports from the first and/or second set of antenna ports to low frequency separation resources, e.g., to frequencies separated within a predefined range. The assigning may be based on a low frequency correlation associated with the assigned antenna ports, e.g., frequency correlation below a threshold amount.

In some aspects, the mapping configuration may include base station 105-b assigning a portion of the plurality of antenna ports from the first and/or second set of antenna ports to high frequency separation resources, e.g., to frequencies separated outside of predefined range. The assigning may be based on a high frequency correlation associated with the assigned antenna ports, e.g., frequency correlation above the threshold amount.

That is, some aspects of the mapping configuration may include mapping antenna ports with high correlation spatially to frequency resources and mapping ports with low correlation spatially to time resources. For the antenna ports mapped to frequency resources, the mapping configuration may include mapping ports with high correlation spatially to resources with low correlation in frequency and mapping ports with low correlation spatially to resources with high correlation in frequency. For example, the mapping configuration may include mapping antenna ports with high correlation spatially to resources with large distances in frequency and mapping antenna ports with low correlation spatially to resources with small distance in frequency.

At 320, base station 105-b may apply a common coding mechanism to at least a portion of the CSI-RSs. When applied, the base station 105-b may map the coded portion of the CSI-RSs for transmission on antenna ports with low spatial correlation. The common coding mechanism may be applied in a time domain resource and/or a frequency domain resource. The antenna ports with low spatial correlation may be cross-polarized antenna ports.

In some aspects where the common coding mechanism is applied in time/frequency resources, the mapping configuration may include mapping antenna ports with low correlation spatially into these resources, e.g., mapping cross-polarized antenna ports into resources with the applied coding mechanism.

At 325, base station 105-b may transmit the CSI-RSs to UE 115-b. In some aspects, base station 105-b may transmit the CSI-RSs to IE 115-b according to the mapping configuration determined at 320. In some aspects, at least a portion of the CSI-RSs may have a common coding mechanism applied.

At 330, UE 115-b may optionally process the CSI-RSs, such as is described with reference to FIGS. 1 and/or 2. At 335, UE 115-b may optionally transmit channel estimate information to base station 105-b. The channel estimate information may be based on the received CSI-RSs and may, in some examples, include joint processing the received CSI-RSs.

Figure 4:
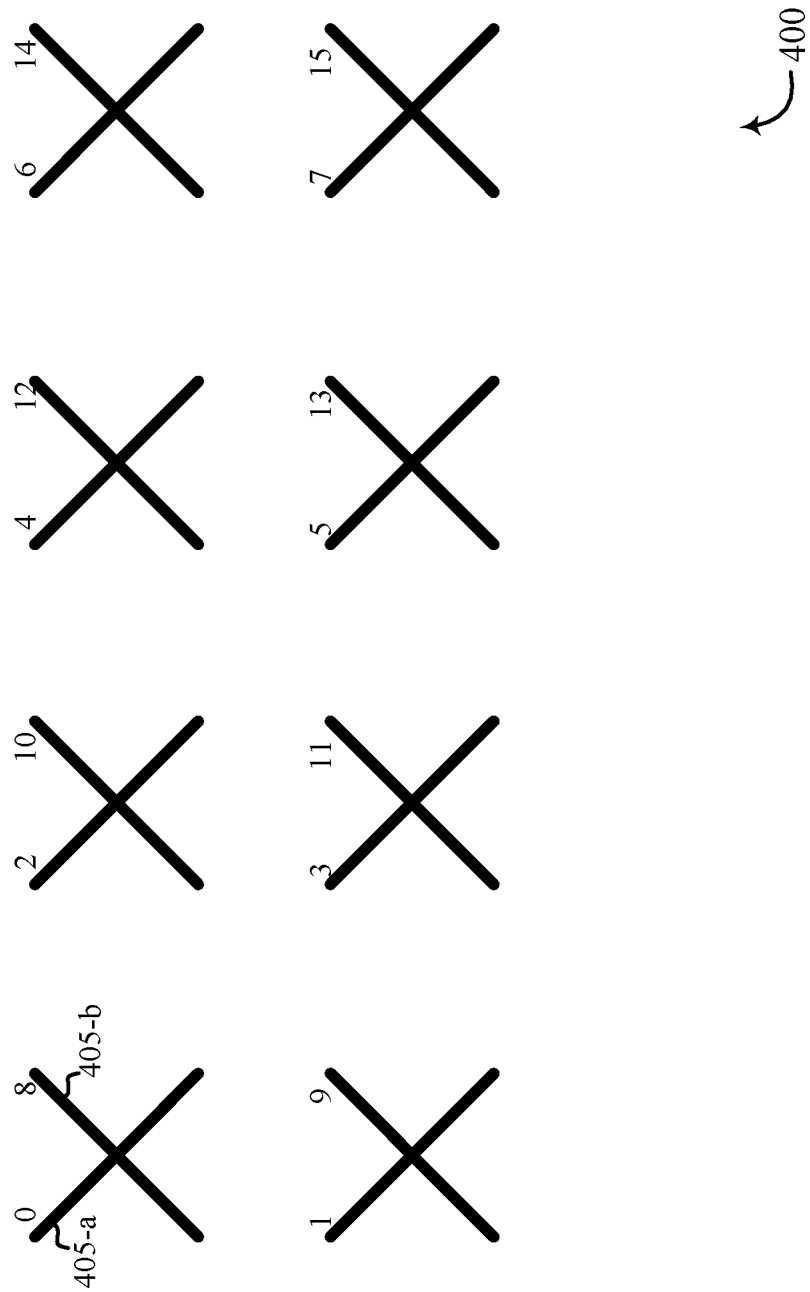
FIG. 4 illustrates an example of an antenna array for use in a wireless communication system that supports channel state information reference signal transmission in accordance with aspects of the present disclosure.

FIG. 4 shows an example configuration for an antenna array 400 for use with CSI-RS transmission, in accordance with aspects of the present disclosure. Antenna array 400 may be a 16 port antenna array that includes antenna ports 0 through 15. Aspects of the antenna array 400 may be implemented by a base station 105, such as is described with reference to FIGS. 1 through 3. For example, a base station 105 may determine a mapping configuration for CSI-RS transmission over the antenna array 400. It is to be understood that a base station 105 may determine a mapping configuration using an antenna array having more or less antenna ports.

Antenna array 400 includes antenna ports 0 through 15. Antenna ports 0 through 7 may be considered co-polarized antenna ports with respect to each other. Antenna ports 8 through 15 may be considered co-polarized antenna ports with respect to each other. Antenna ports 0 through 7 may be considered cross-polarized antenna ports with respect to antenna ports 8 through 15. For example, antenna port 0 (identified as antenna port 405-a) may be considered as a cross-polarized antenna port with respect to antenna port 8 (identified as antenna port 405-b).

In some aspects, a base station 105 may implement a mapping configuration that includes mapping different sets of antenna ports into frequency and time resources. For example, antenna ports of antenna array 400 having high spatial correlation may be mapped to frequency resources and antenna ports with low spatial correlation may be mapped to time resources. In one example, cross-polarized antenna ports may be mapped to time division resources and co-polarized antenna ports may be mapped into different frequency resources. The mapping configuration may provide improved frequency granularity for a receiving device using joint processing techniques.

Figure 5:
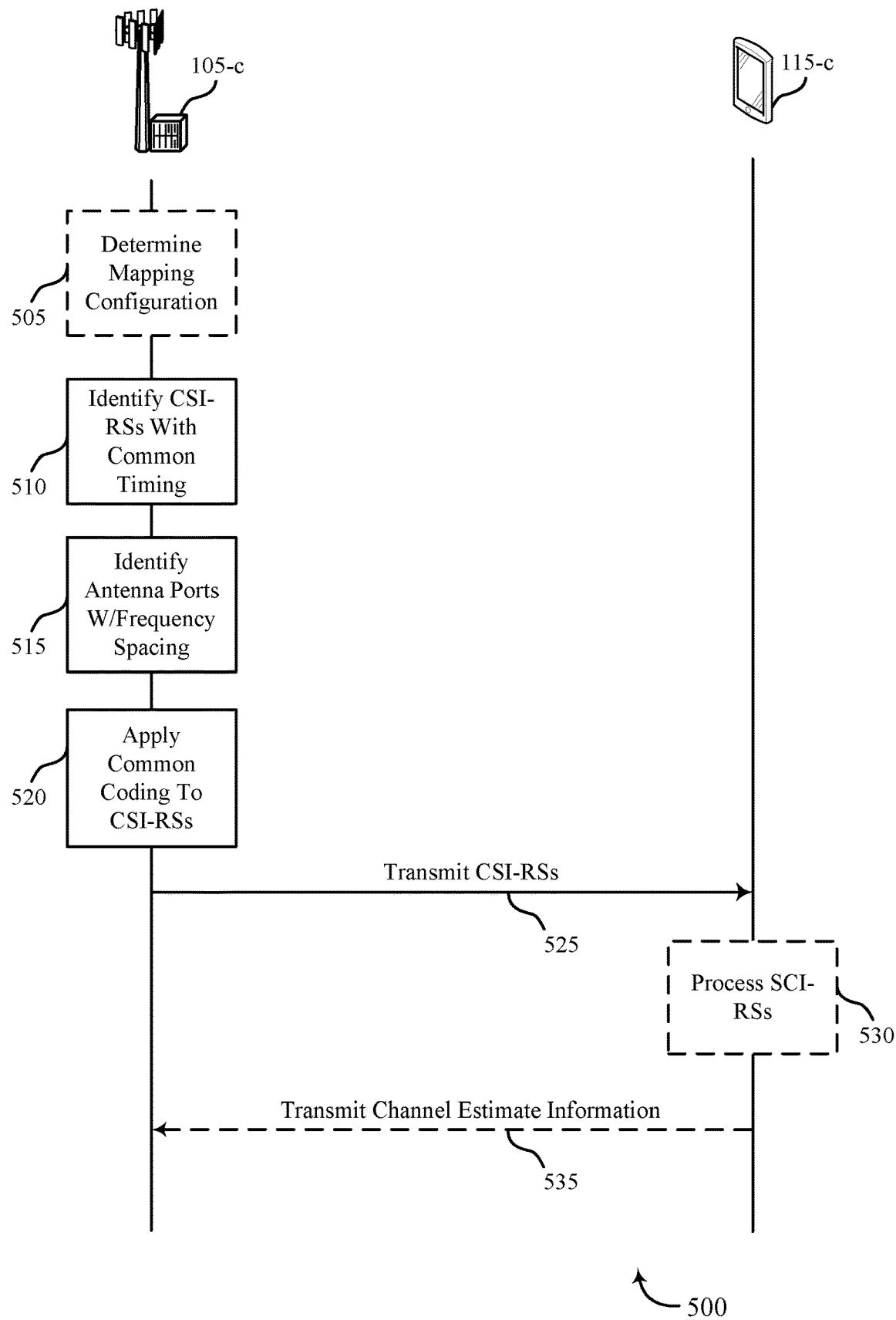
FIG. 5 illustrates an example of a process flow in a wireless communication system that supports channel state information reference signal transmission in accordance with aspects of the present disclosure.

FIG. 5 shows a process flow 500 in a wireless communication system that supports CSI-RS transmission, in accordance with various aspects of the present disclosure. Process flow 500 may include a base station 105-c and a UE 115-c, which may be examples of the corresponding devices described with reference to FIGS. 1 through 3. Generally, process flow 500 illustrates an example of base station 105-c applying a common coding mechanism to CSI-RSs having a common timing domain feature. In some aspects, base station 105-c may be configured with a plurality of antenna ports, e.g., a large number of antenna ports in a massive MIMO system.

At 505, base station 105-c may optionally determine a mapping configuration for the plurality of antenna ports, such as is described with reference to FIGS. 3 and 4.

At 510, base station 105-c may identify a set of CSI-RSs with a common timing domain. The common timing domain may refer to CSI-RSs for transmission during the same symbol period. At 515, base station 105-c may identify antenna ports having high frequency separation, e.g., frequency separation or spacing above a threshold amount.

At 520, base station 105-c may apply a common coding mechanism to the set of CSI-RSs. The common coding mechanism may be a DFT code, a Walsh code, or the like.

Generally, the applied common coding mechanism may improve frequency granularity for the receiving device channel estimation. In one example, the applying the common coding mechanism may include applying a 4-DFT matric to cover four antenna ports with equal spacing in frequency, e.g., antenna ports 0 through 3, antenna ports 4 through 7, etc., of antenna array 400.

At 525, base station 105-c may transmit the set of CSI-RSs to UE 115-c. In some aspects, base station 105-c may transmit the set of CSI-RSs to UE 115-c using a multiplexing technique, e.g., a TDM technique and/or a FDM technique.

At 530, UE 115-c may optionally process the CSI-RSs, such as is described with reference to FIGS. 1 and/or 2. At 535, UE 115-c may optionally transmit channel estimate information to base station 105-c. The channel estimate information may be based on the received CSI-RSs and may, in some examples, include joint processing the received CSI-RSs.

Figure 6:
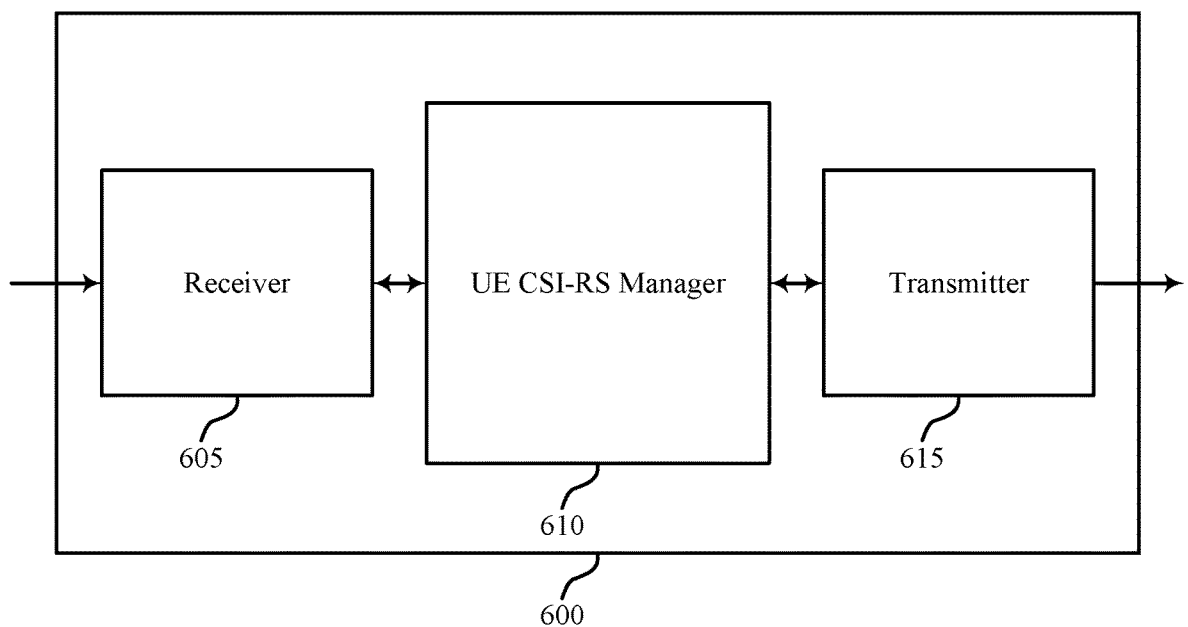
FIGS. 6 through 8 show block diagrams of a wireless device that supports channel state information reference signal transmission in accordance with aspects of the present disclosure.

FIG. 6 shows a block diagram of a wireless device 600 that supports CSI-RS transmission in accordance with various aspects of the present disclosure. Wireless device 600 may be an example of aspects of a UE 115 described with reference to FIGS. 1 through 3 and 5. Wireless device 600 may include receiver 605, UE CSI-RS manager 610 and transmitter 615. Wireless device 600 may also include a processor. Each of these components may be in communication with each other.

The receiver 605 may receive information such as packets, user data, or control information associated with various information channels (e.g., control channels, data channels, and information related to CSI-RS transmission, etc.). Information may be passed on to other components of the device. The receiver 605 may be an example of aspects of the transceiver 925 described with reference to FIG. 9.

The UE CSI-RS manager 610 may receive a CSI-RS from a transmitting device, identify a joint correlation metric for a channel associated with the CSI-RS, the joint correlation metric based on a frequency correlation and a spatial correlation of the channel, and determine a channel estimate for the channel based on the joint correlation metric. The UE CSI-RS manager 610 may also be an example of aspects of the UE CSI-RS manager 905 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include a plurality of antennas.

Figure 7:
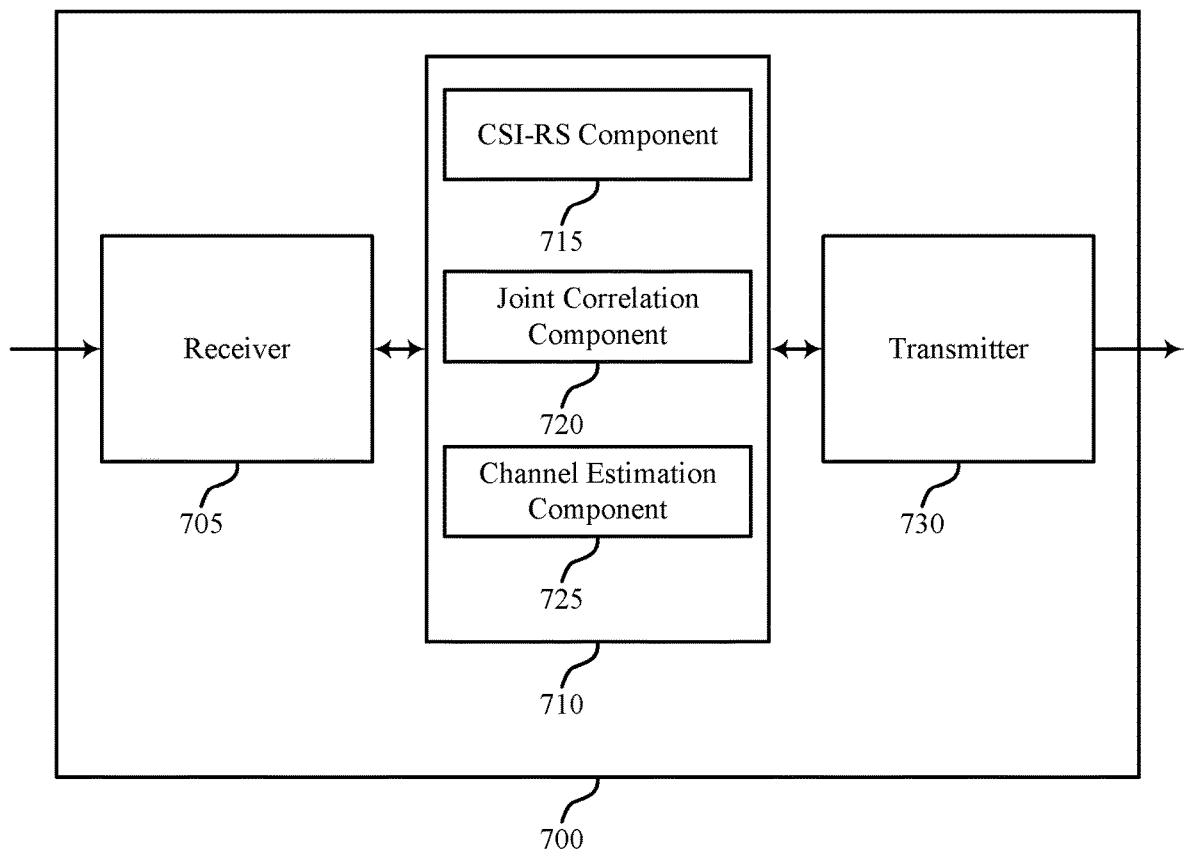

FIG. 7 shows a block diagram of a wireless device 700 that supports CSI-RS transmission in accordance with various aspects of the present disclosure. Wireless device 700 may be an example of aspects of a wireless device 600 or a UE 115 described with reference to FIGS. 1 through 3, 5, and 6. Wireless device 700 may include receiver 705, UE CSI-RS manager 710 and transmitter 730. Wireless device 700 may also include a processor. Each of these components may be in communication with each other.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9.

The UE CSI-RS manager 710 may be an example of aspects of UE CSI-RS manager 610 described with reference to FIG. 6. The UE CSI-RS manager 710 may include CSI-RS component 715, joint correlation component 720 and channel estimation component 725. The UE CSI-RS manager 710 may be an example of aspects of the UE CSI-RS manager 905 described with reference to FIG. 9.

The CSI-RS component 715 may receive a CSI-RS from a transmitting device. The joint correlation component 720 may identify a joint correlation metric for a channel associated with the CSI-RS, the joint correlation metric based on a frequency correlation and a spatial correlation of the channel. The channel estimation component 725 may determine a channel estimate for the channel based on the joint correlation metric.

The transmitter 730 may transmit signals received from other components of wireless device 700. In some examples, the transmitter 730 may be collocated with a receiver in a transceiver module. For example, the transmitter 730 may be an example of aspects of the transceiver 925 described with reference to FIG. 9. The transmitter 730 may utilize a single antenna, or it may utilize a plurality of antennas.

Figure 8:
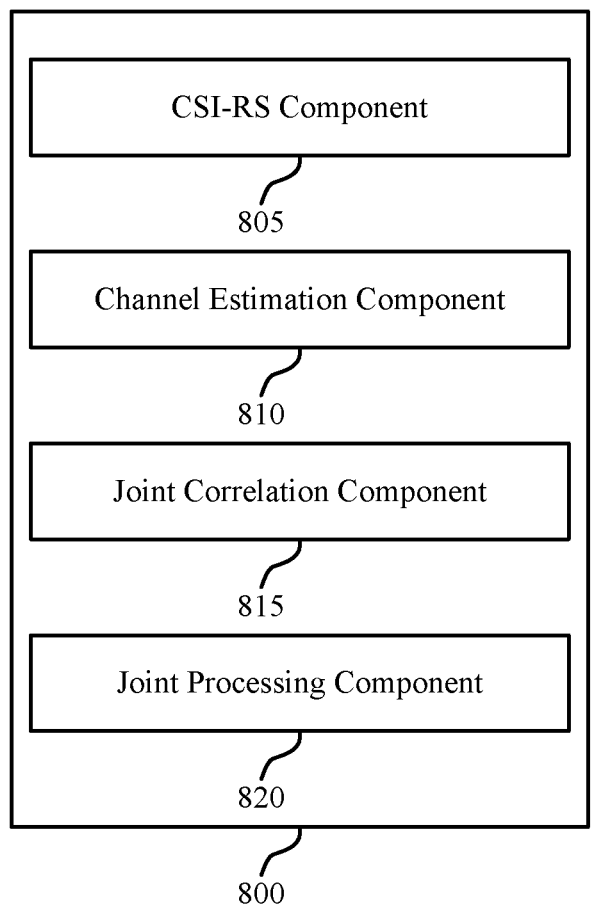

FIG. 8 shows a block diagram of a UE CSI-RS manager 800 which may be an example of the corresponding component of wireless device 600 or wireless device 700. That is, UE CSI-RS manager 800 may be an example of aspects of UE CSI-RS manager 610 or UE CSI-RS manager 710 described with reference to FIGS. 6 and 7. The UE CSI-RS manager 800 may also be an example of aspects of the UE CSI-RS manager 905 described with reference to FIG. 9.

The UE CSI-RS manager 800 may include CSI-RS component 805, channel estimation component 810, joint correlation component 815 and joint processing component 820. Each of these modules may communicate, directly or indirectly, with one another (e.g., via one or more buses).

The CSI-RS component 805 may receive a CSI-RS from a transmitting device. The channel estimation component 810 may determine a channel estimate for the channel based on the joint correlation metric. The joint correlation component 815 may identify a joint correlation metric for a channel associated with the CSI-RS, the joint correlation metric based on a frequency correlation and a spatial correlation of the channel.

The joint processing component 820 may perform joint processing across a set of RBs, e.g., PRBs. In some cases, the joint processing includes identifying the joint correlation metric based on a set of CSI-RSs. In some cases, determining the channel estimate includes performing joint processing on a set of CSI-RSs received across a set of antenna ports.

Figure 9:
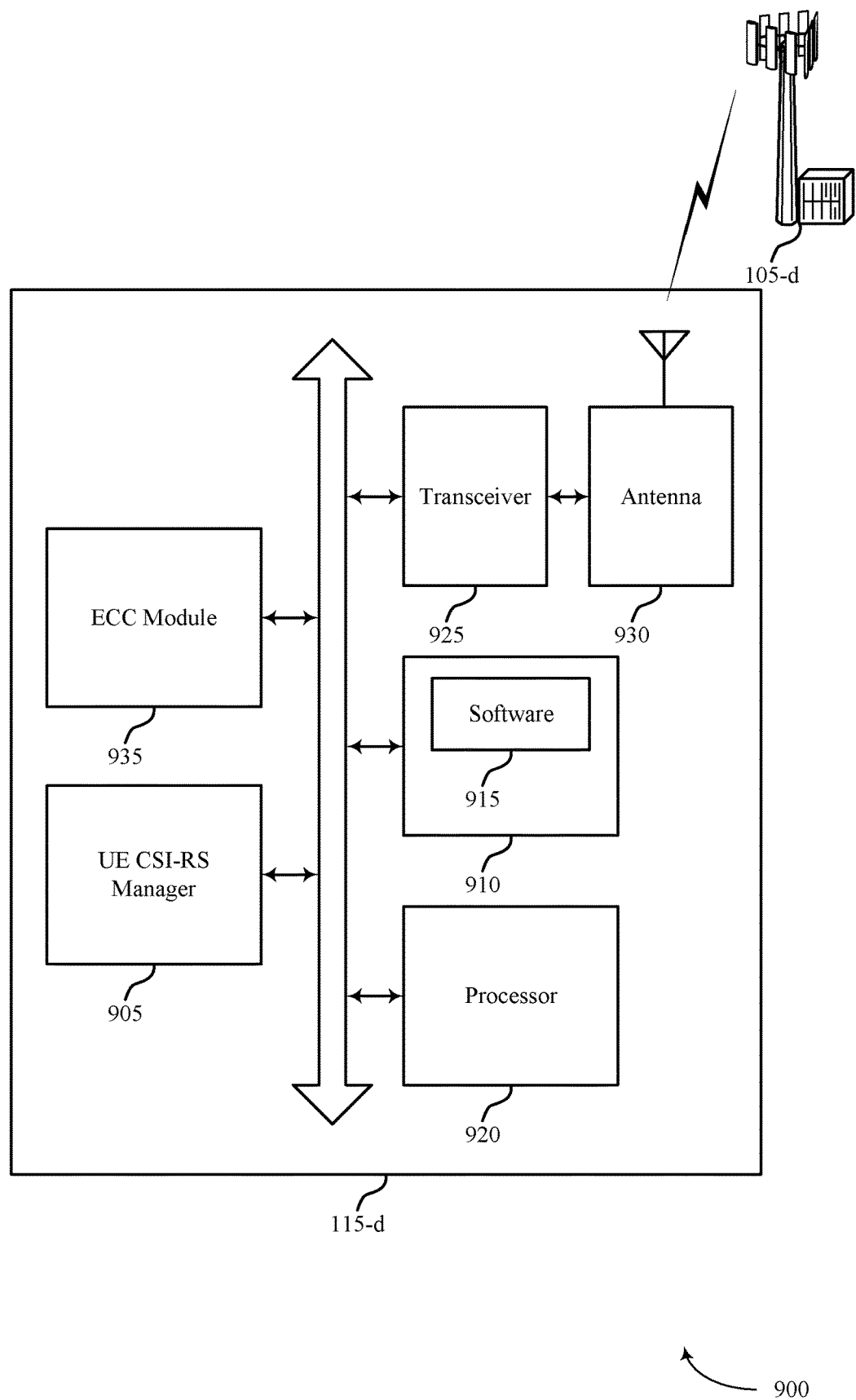
FIG. 9 illustrates a block diagram of a system including a UE that supports channel state information reference signal transmission in accordance with aspects of the present disclosure.

FIG. 9 shows a diagram of a system 900 including a device that supports CSI-RS transmission in accordance with various aspects of the present disclosure. For example, system 900 may include UE 115-d, which may be an example of a wireless device 600, a wireless device 700, or a UE 115 as described with reference to FIGS. 1 through 3 and 5 through 8.

UE 115-d may also include UE CSI-RS manager 905, memory 910, processor 920, transceiver 925, antenna 930 and ECC module 935. Each of these modules may communicate, directly or indirectly, with one another (e.g., via one or more buses). The UE CSI-RS manager 905 may be an example of a UE CSI-RS manager as described with reference to FIGS. 6 through 8.

The memory 910 may include random access memory (RAM) and read only memory (ROM). The memory 910 may store computer-readable, computer-executable software including instructions that, when executed, cause the processor to perform various functions described herein (e.g., CSI-RS transmission, etc.). In some cases, the software 915 may not be directly executable by the processor but may cause a computer (e.g., when compiled and executed) to perform functions described herein. The processor 920 may include an intelligent hardware device, (e.g., a central processing unit (CPU), a microcontroller, an application specific integrated circuit (ASIC), etc.).

The transceiver 925 may communicate bi-directionally, via one or more antennas, wired, or wireless links, with one or more networks, as described above. For example, the transceiver 925 may communicate bi-directionally with a base station 105, such as base station 105-d, or a UE 115. The transceiver 925 may also include a modem to modulate the packets and provide the modulated packets to the antennas for transmission, and to demodulate packets received from the antennas. In some cases, the wireless device may include a single antenna 930. However, in some cases the device may have more than one antenna 930, which may be capable of concurrently transmitting or receiving multiple wireless transmissions.

ECC module 935 may enable operations in ECCs as described above with reference to FIG. 1. For example, ECC operations may include communicating in unlicensed spectrum, using a wide bandwidth, or using reduced length TTIs.

Figure 10:
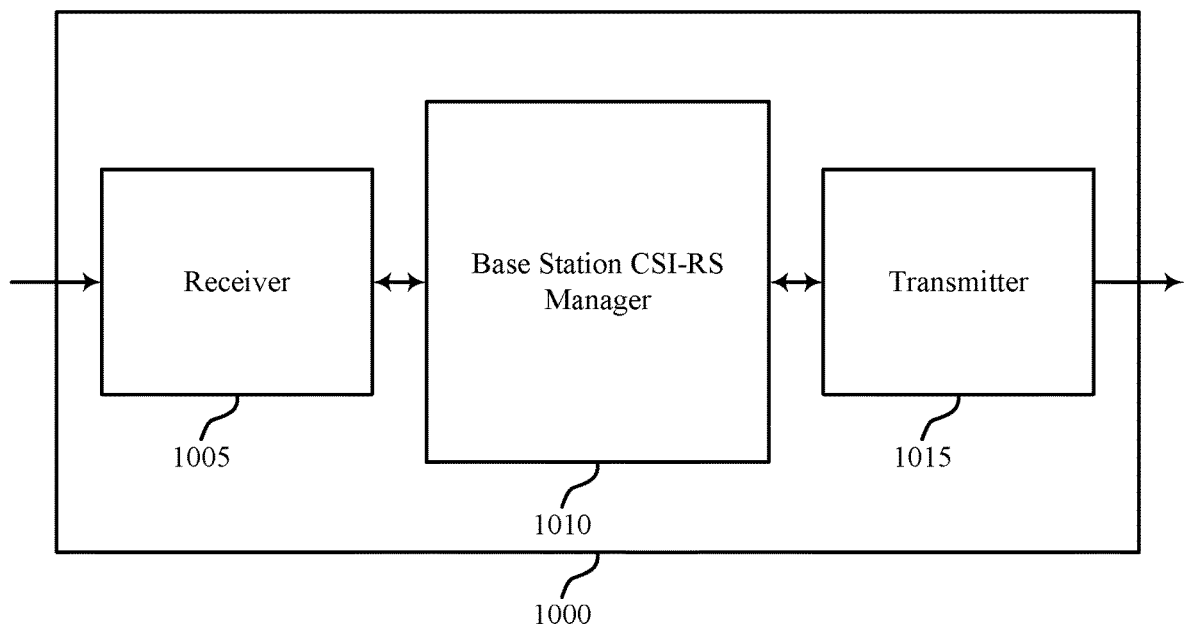
FIGS. 10 through 12 show block diagrams of a wireless device that supports channel state information reference signal transmission in accordance with aspects of the present disclosure.

FIG. 10 shows a block diagram of a wireless device 1000 that supports CSI-RS transmission in accordance with various aspects of the present disclosure. Wireless device 1000 may be an example of aspects of a base station 105 described with reference to FIGS. 1 through 3 and 5. Wireless device 1000 may include receiver 1005, base station CSI-RS manager 1010 and transmitter 1015. Wireless device 1000 may also include a processor. Each of these components may be in communication with each other.

The receiver 1005 may receive information such as packets, user data, or control information associated with various information channels (e.g., control channels, data channels, and information related to CSI-RS transmission, etc.). Information may be passed on to other components of the device. The receiver 1005 may be an example of aspects of the transceiver 1325 described with reference to FIG. 13.

The base station CSI-RS manager 1010 may determine a mapping configuration associated with a set of antenna ports, the mapping configuration including a first mapping of a first set of antenna ports with at least a first threshold amount of spatial correlation to frequency resources and a second mapping of a second set of antenna ports with less than the first threshold amount of spatial correlation to time resources, and transmit a set of CSI-RSs using the set of antenna ports and according to the mapping configuration.

The base station CSI-RS manager 1010 may also identify a set of CSI-RSs having a common timing domain, apply a common coding mechanism to the set of CSI-RSs, and transmit the set of CSI-RSs in the common timing domain and according to a multiplexing technique, the set of CSI-RSs transmitted using a set of antenna ports having a threshold amount of frequency spacing. The base station CSI-RS manager 1010 may also be an example of aspects of the base station CSI-RS manager 1305 described with reference to FIG. 13.

The transmitter 1015 may transmit signals received from other components of wireless device 1000. In some examples, the transmitter 1015 may be collocated with a receiver in a transceiver module. For example, the transmitter 1015 may be an example of aspects of the transceiver 1325 described with reference to FIG. 13. The transmitter 1015 may include a single antenna, or it may include a plurality of antennas.

Figure 11:
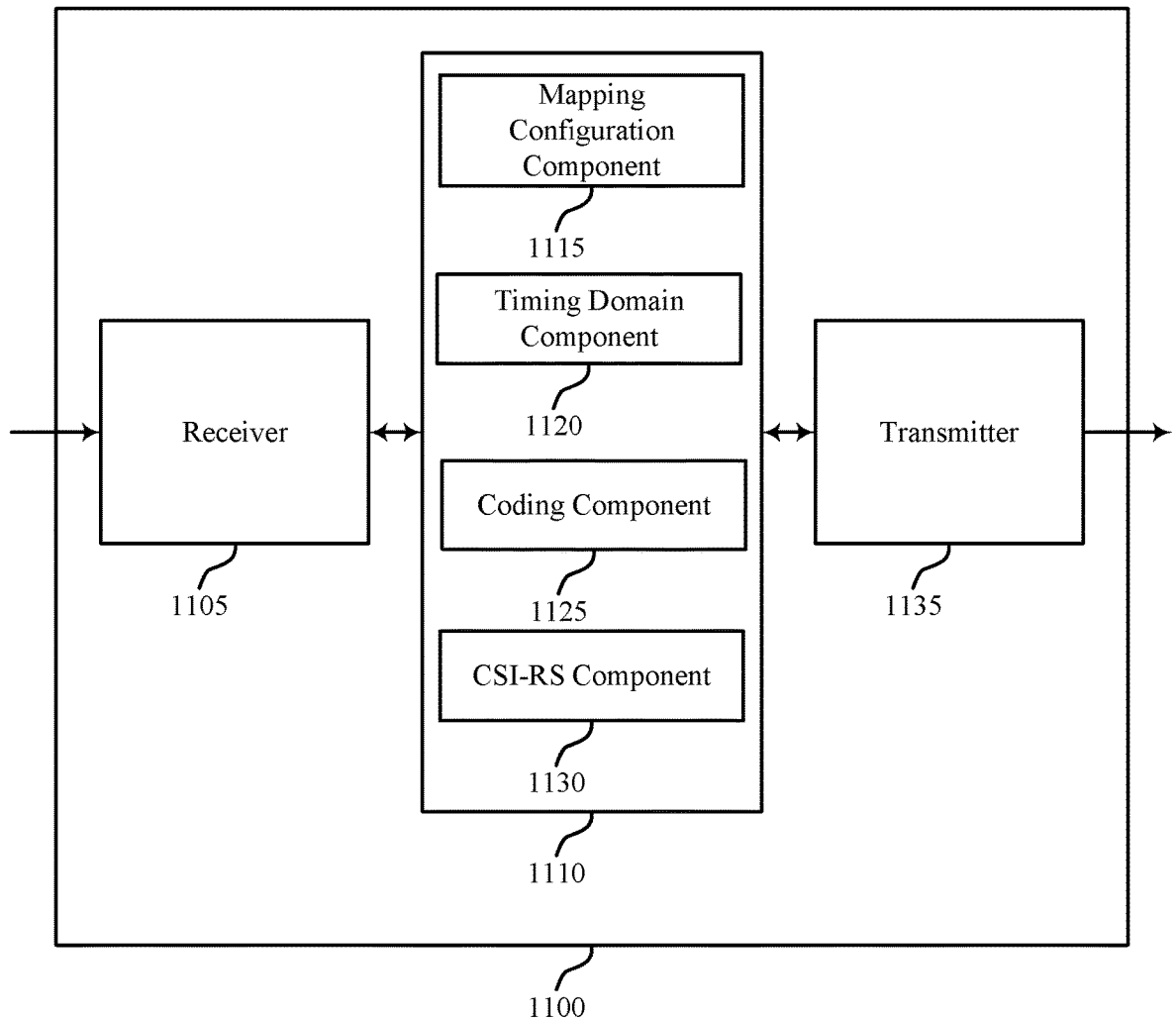

FIG. 11 shows a block diagram of a wireless device 1100 that supports CSI-RS transmission in accordance with various aspects of the present disclosure. Wireless device 1100 may be an example of aspects of a wireless device 1000 or a base station 105 described with reference to FIGS. 1 through 3, 5, and 10. Wireless device 1100 may include receiver 1105, base station CSI-RS manager 1110 and transmitter 1135. Wireless device 1100 may also include a processor. Each of these components may be in communication with each other.

The receiver 1105 may receive information which may be passed on to other components of the device. The receiver 1105 may also perform the functions described with reference to the receiver 1005 of FIG. 10. The receiver 1105 may be an example of aspects of the transceiver 1325 described with reference to FIG. 13.

The base station CSI-RS manager 1110 may be an example of aspects of base station CSI-RS manager 1005 described with reference to FIG. 10. The base station CSI-RS manager 1110 may include mapping configuration component 1115, timing domain component 1120, coding component 1125 and CSI-RS component 1130. The base station CSI-RS manager 1110 may be an example of aspects of the base station CSI-RS manager 1305 described with reference to FIG. 13.

The mapping configuration component 1115 may determine a mapping configuration associated with a set of antenna ports, the mapping configuration including a first mapping of a first set of antenna ports with at least a first threshold amount of spatial correlation to frequency resources and a second mapping of a second set of antenna ports with less than the first threshold amount of spatial correlation to time resources.

The timing domain component 1120 may identify a set of CSI-RSs having a common timing domain.

The coding component 1125 may apply a coding mechanism to at least a portion of the CSI-RSs prior to transmission, and apply a common coding mechanism to the set of CSI-RSs. In some cases, the coding mechanism is applied in a time domain resource, a frequency domain resource, or combinations thereof. In some cases, the common coding mechanism includes at least one of a DFT code or a Walsh code.

The CSI-RS component 1130 may transmit a set of CSI-RSs using the set of antenna ports and according to the mapping configuration, and transmit the set of CSI-RSs in the common timing domain and according to a multiplexing technique, the set of CSI-RSs transmitted using a set of antenna ports having a threshold amount of frequency spacing. In some cases, the multiplexing technique includes a TDM technique, a FDM technique, or combinations thereof.

The transmitter 1135 may transmit signals received from other components of wireless device 1100. In some examples, the transmitter 1135 may be collocated with a receiver in a transceiver module. For example, the transmitter 1135 may be an example of aspects of the transceiver 1325 described with reference to FIG. 13. The transmitter 1135 may utilize a single antenna, or it may utilize a plurality of antennas.

Figure 12:
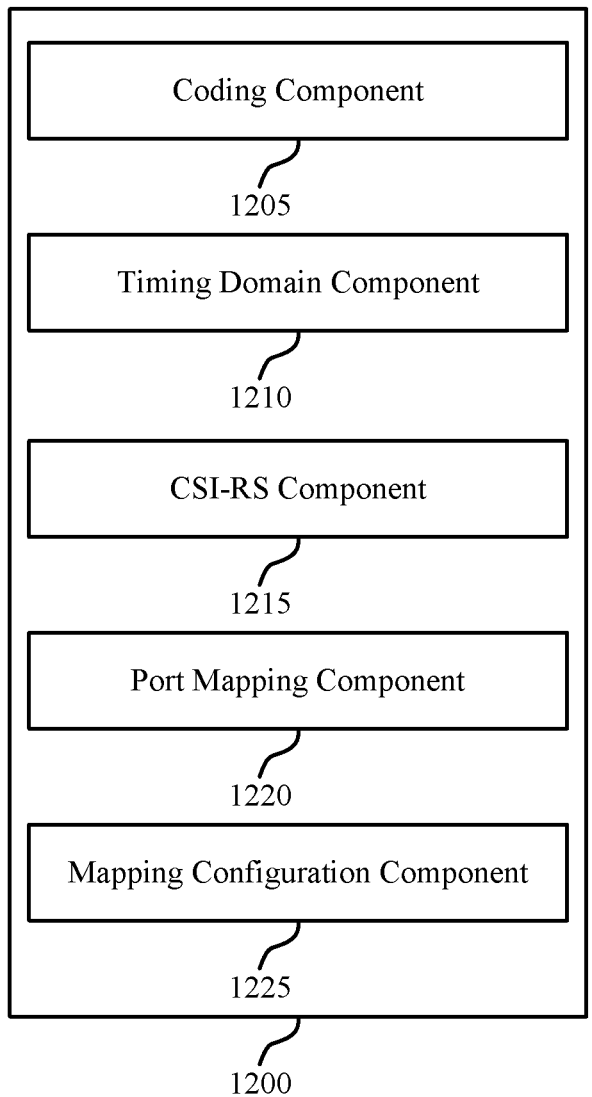

FIG. 12 shows a block diagram of a base station CSI-RS manager 1200 which may be an example of the corresponding component of wireless device 1000 or wireless device 1100. That is, base station CSI-RS manager 1200 may be an example of aspects of base station CSI-RS manager 1010 or base station CSI-RS manager 1110 described with reference to FIGS. 10 and 11. The base station CSI-RS manager 1200 may also be an example of aspects of the base station CSI-RS manager 1305 described with reference to FIG. 13.

The base station CSI-RS manager 1200 may include coding component 1205, timing domain component 1210, CSI-RS component 1215, port mapping component 1220 and mapping configuration component 1225. Each of these modules may communicate, directly or indirectly, with one another (e.g., via one or more buses).

The coding component 1205 may apply a coding mechanism to at least a portion of the CSI-RSs prior to transmission, and apply a common coding mechanism to the set of CSI-RSs. In some cases, the coding mechanism is applied in a time domain resource, a frequency domain resource, or combinations thereof. In some cases, the common coding mechanism includes at least one of a DFT code or a Walsh code.

The timing domain component 1210 may identify a set of CSI-RSs having a common timing domain.

The CSI-RS component 1215 may transmit a set of CSI-RSs using the set of antenna ports and according to the mapping configuration, and transmit the set of CSI-RSs in the common timing domain and according to a multiplexing technique, the set of CSI-RSs transmitted using a set of antenna ports having a threshold amount of frequency spacing.

The port mapping component 1220 may map antenna ports with less than the first threshold amount of spatial correlation to resources with greater than the second threshold amount of frequency correlation, and assign at least a portion of the antenna ports of the first set or the second set of antenna ports to frequencies separated within a predefined range. The assigning may be based on a frequency correlation associated with the at least a portion of the antenna ports, the frequency correlation being less than the second threshold amount.

The port mapping component 1220 may also assign at least a portion of the antenna ports of the first set or the second set of antenna ports to frequencies separated outside a predefined range, the assigning based on a frequency correlation associated with the at least a portion of the antenna ports, the frequency correlation being greater than the second threshold amount, map the coded portion of the CSI-RSs for transmission on antenna ports with low spatial correlation, and map co-polarized antenna ports to adjacent frequency domain symbols.

In some cases, mapping the antenna ports includes: mapping antenna ports with at least the first threshold amount of spatial correlation to resources with less than a second threshold amount of frequency correlation. In some cases, the antenna ports with low spatial correlation are cross-polarized antenna ports. In some cases, mapping the antenna ports includes: mapping cross-polarized antenna ports to adjacent time domain symbols.

The mapping configuration component 1225 may determine a mapping configuration associated with a set of antenna ports, the mapping configuration including a first mapping of a first set of antenna ports with at least a first threshold amount of spatial correlation to frequency resources and a second mapping of a second set of antenna ports with less than the first threshold amount of spatial correlation to time resources.

Figure 13:
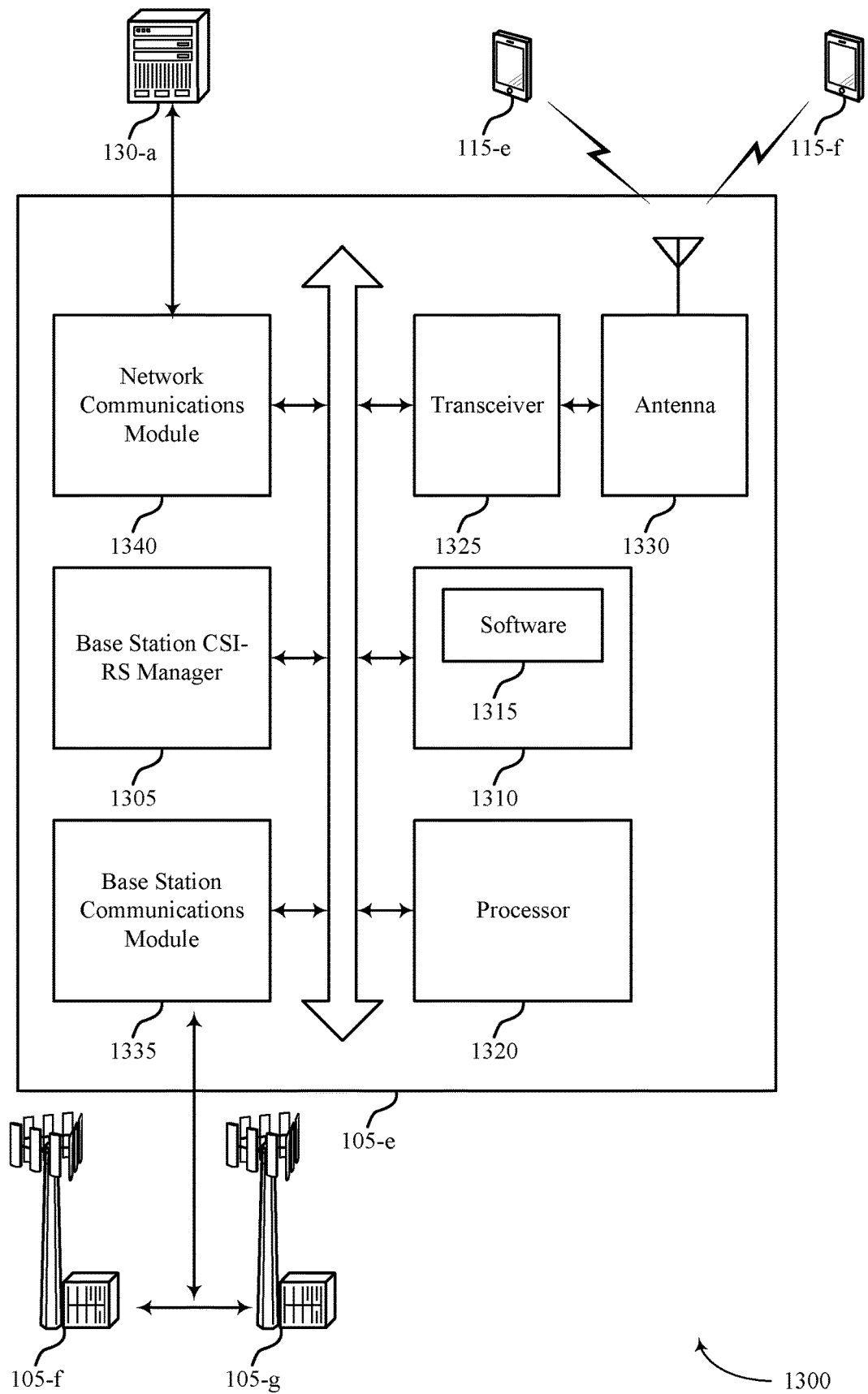
FIG. 13 illustrates a block diagram of a system including a base station that supports channel state information reference signal transmission in accordance with aspects of the present disclosure.

FIG. 13 shows a diagram of a wireless system 1300 including a device configured that supports CSI-RS transmission in accordance with various aspects of the present disclosure. For example, system 1300 may include base station 105-*e*, which may be an example of a wireless device 1000, a wireless device 1100, or a base station 105 as described with reference to FIGS. 1 through 3, 5, and 10 through 12. Base station 105-*e* may also include components for bi-directional voice and data communications including components for transmitting communications and components for receiving communications. For example, base station 105-e may communicate bi-directionally with one or more UEs 115, such as UEs 115-e and/or 115-f.

Base station 105-e may also include base station CSI-RS manager 1305, memory 1310, processor 1320, transceiver 1325, antenna 1330, base station communications module 1335 and network communications module 1340. Each of these modules may communicate, directly or indirectly, with one another (e.g., via one or more buses). The base station CSI-RS manager 1305 may be an example of a base station CSI-RS manager as described with reference to FIGS. 10 through 12.

The memory 1310 may include RAM and ROM. The memory 1310 may store computer-readable, computer-executable software including instructions that, when executed, cause the processor to perform various functions described herein (e.g., CSI-RS transmission, etc.). In some cases, the software 1315 may not be directly executable by the processor but may cause a computer (e.g., when compiled and executed) to perform functions described herein. The processor 1320 may include an intelligent hardware device, (e.g., a CPU, a microcontroller, an ASIC, etc.)

The transceiver 1325 may communicate bi-directionally, via one or more antennas, wired, or wireless links, with one or more networks, as described above. For example, the transceiver 1325 may communicate bi-directionally with a base station 105 or a UE 115. The transceiver 1325 may also include a modem to modulate the packets and provide the modulated packets to the antennas for transmission, and to demodulate packets received from the antennas. In some cases, the wireless device may include a single antenna 1330. However, in some cases the device may have more than one antenna 930, which may be capable of concurrently transmitting or receiving multiple wireless transmissions.

The base station communications module 1335 may manage communications with other base station 105, such as base stations 105-f and/or 105-g, and may include a controller or scheduler for controlling communications with UEs 115 in cooperation with other base stations 105. For example, the base station communications module 1335 may coordinate scheduling for transmissions to UEs 115 for various interference mitigation techniques such as beamforming or joint transmission. In some examples, base station communications module 1335 may provide an X2 interface within an LTE/LTE-A wireless communication network technology to provide communication between base stations 105.

The network communications module 1340 may manage communications with the core network 130-a (e.g., via one or more wired backhaul links). For example, the network communications module 1340 may manage the transfer of data communications for client devices, such as one or more UEs 115.

Figure 14:
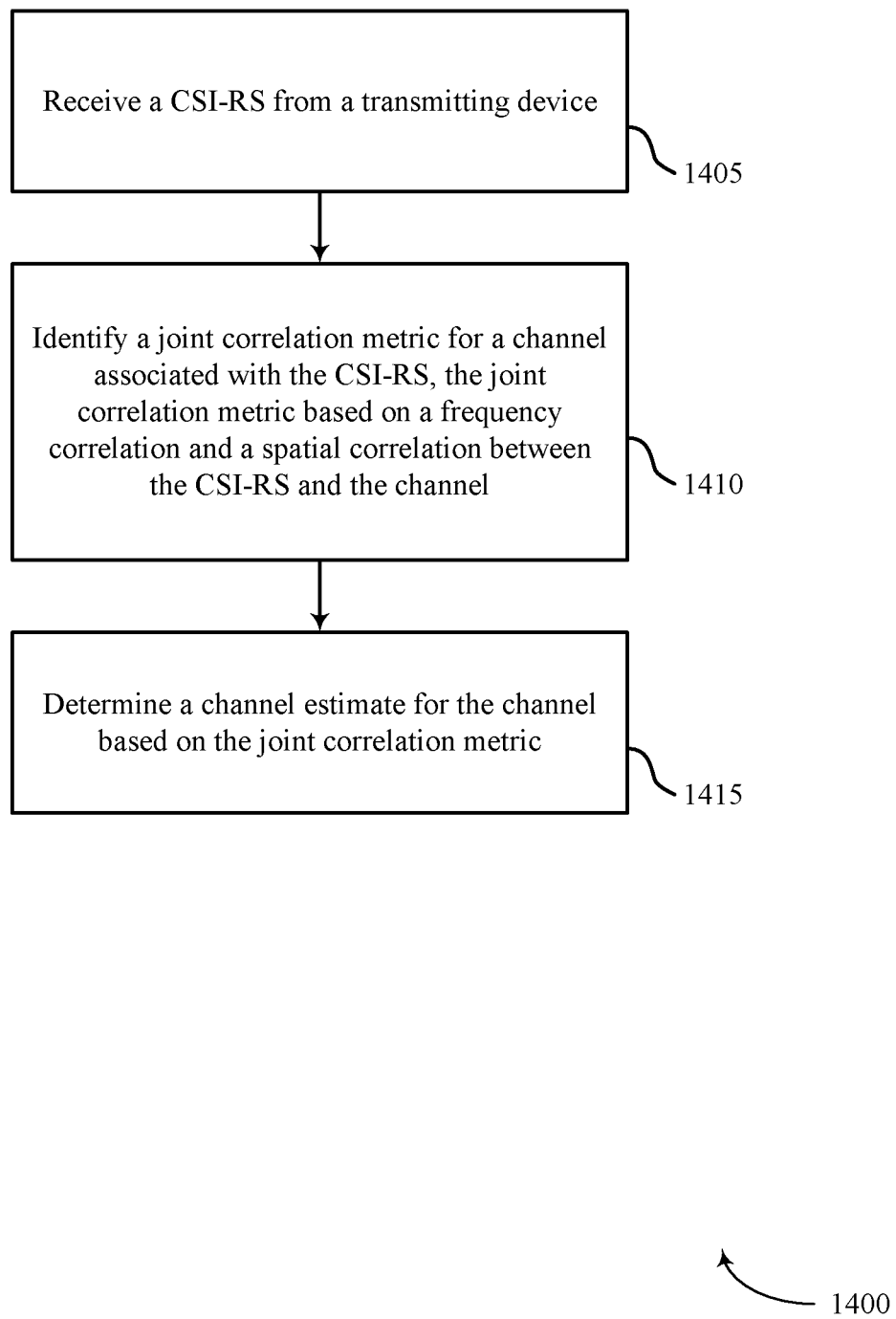
FIGS. 14 through 18 illustrate methods for channel state information reference signal transmission in accordance with aspects of the present disclosure.

FIG. 14 shows a flowchart illustrating a method 1400 for CSI-RS transmission in accordance with various aspects of the present disclosure. The operations of method 1400 may be implemented by a device such as a UE 115 or its components as described with reference to FIGS. 1 through 3 and 5. For example, the operations of method 1400 may be performed by the UE CSI-RS manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may receive a CSI-RS from a transmitting device as described above with reference to FIGS. 2 through 5. In certain examples, the operations of block 1405 may be performed by the CSI-RS component as described with reference to FIGS. 7 and 8.

At block 1410, the UE 115 may identify a joint correlation metric for a channel associated with the CSI-RS, the joint correlation metric based on a frequency correlation and a spatial correlation of the channel as described above with reference to FIGS. 2 through 5. In certain examples, the operations of block 1410 may be performed by the joint correlation component as described with reference to FIGS. 7 and 8.

At block 1415, the UE 115 may determine a channel estimate for the channel based on the joint correlation metric as described above with reference to FIGS. 2 through 5. In certain examples, the operations of block 1415 may be performed by the channel estimation component as described with reference to FIGS. 7 and 8.

Figure 15:
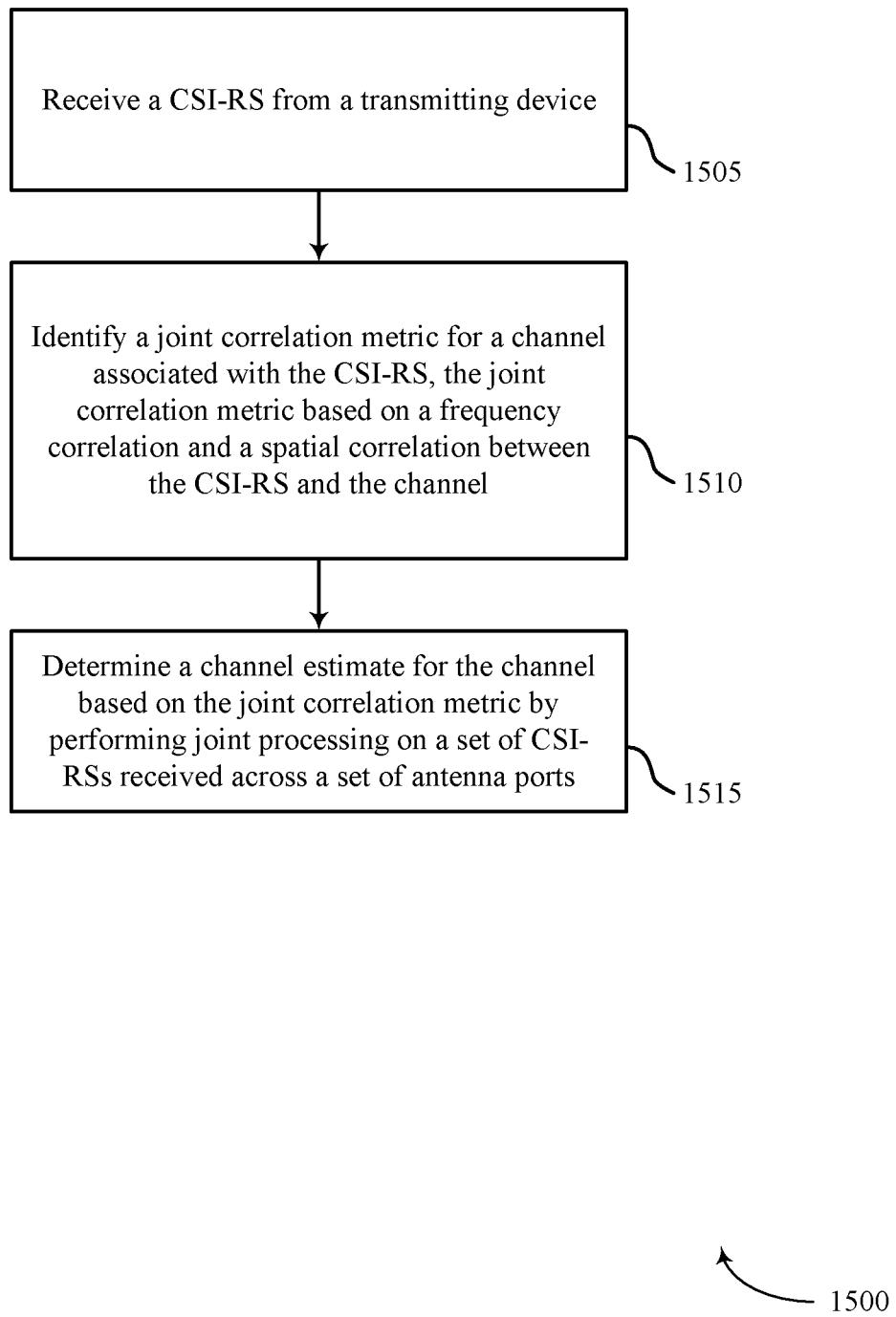

FIG. 15 shows a flowchart illustrating a method 1500 for CSI-RS transmission in accordance with various aspects of the present disclosure. The operations of method 1500 may be implemented by a device such as a UE 115 or its components as described with reference to FIGS. 1 through 3 and 5. For example, the operations of method 1500 may be performed by the UE CSI-RS manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive a CSI-RS from a transmitting device as described above with reference to FIGS. 2 through 5. In certain examples, the operations of block 1505 may be performed by the CSI-RS component as described with reference to FIGS. 7 and 8.

At block 1510, the UE 115 may identify a joint correlation metric for a channel associated with the CSI-RS, the joint correlation metric based on a frequency correlation and a spatial correlation of the channel as described above with reference to FIGS. 2 through 5. In certain examples, the operations of block 1510 may be performed by the joint correlation component as described with reference to FIGS. 7 and 8.

At block 1515, the UE 115 may determine a channel estimate for the channel based on the joint correlation metric as described above with reference to FIGS. 2 through 5. In some cases, determining the channel estimate includes: performing joint processing on a set of CSI-RSs received across a set of antenna ports. In certain examples, the operations of block 1515 may be performed by the channel estimation component as described with reference to FIGS. 7 and 8.

Figure 16:
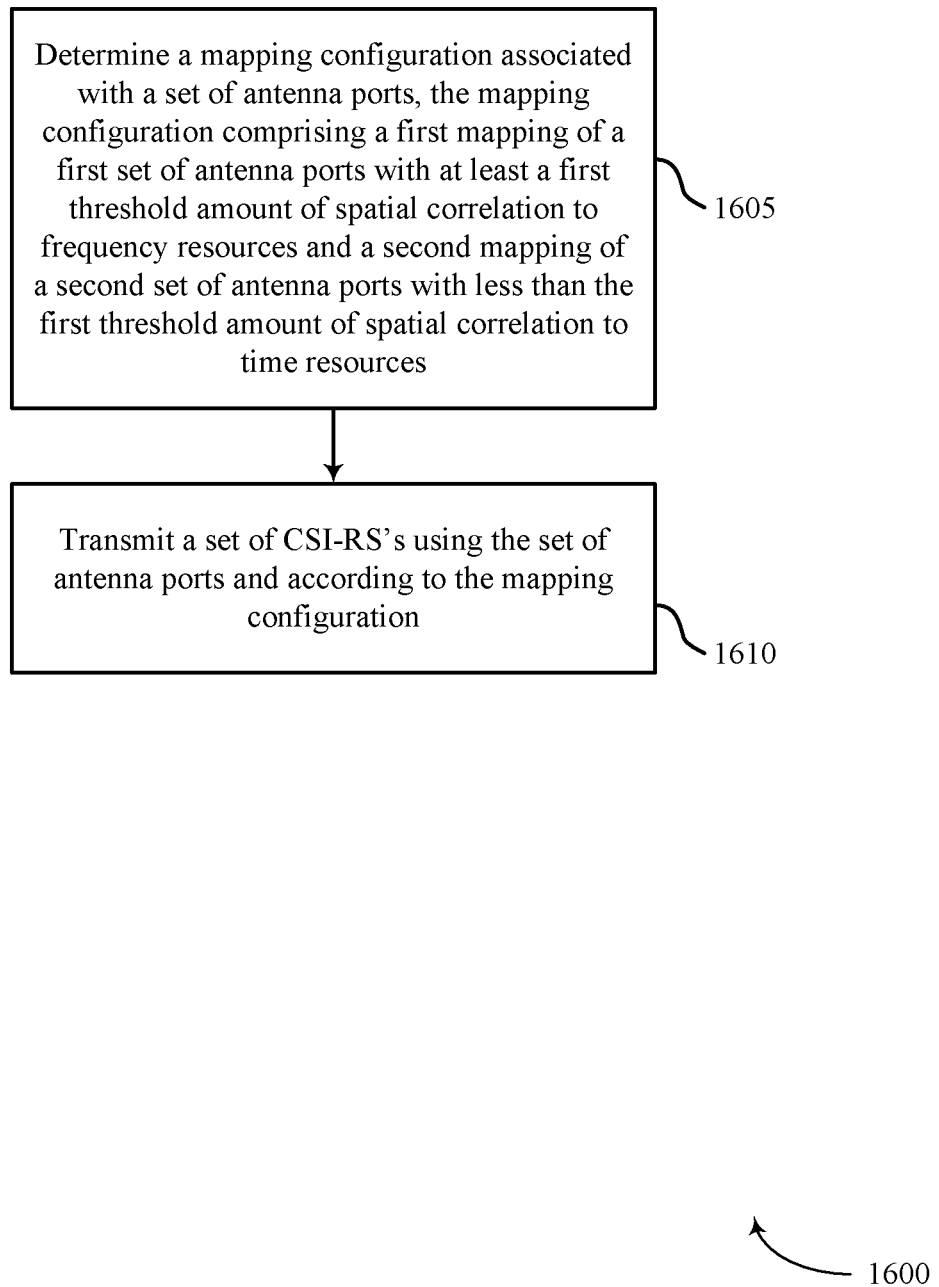

FIG. 16 shows a flowchart illustrating a method 1600 for CSI-RS transmission in accordance with various aspects of the present disclosure. The operations of method 1600 may be implemented by a device such as a base station 105 or its components as described with reference to FIGS. 1 through 3 and 5. For example, the operations of method 1600 may be performed by the base station CSI-RS manager as described herein. In some examples, the base station 105 may execute a set of codes to control the functional elements of the device to perform the functions described below. Additionally or alternatively, the base station 105 may perform aspects the functions described below using special-purpose hardware.

At block 1605, the base station 105 may determine a mapping configuration associated with a set of antenna ports, the mapping configuration including a first mapping of a first set of antenna ports with at least a first threshold amount of spatial correlation to frequency resources and a second mapping of a second set of antenna ports with less than the first threshold amount of spatial correlation to time resources as described above with reference to FIGS. 2 through 5. In certain examples, the operations of block 1605 may be performed by the mapping configuration component as described with reference to FIGS. 11 and 12.

At block 1610, the base station 105 may transmit a set of CSI-RSs using the set of antenna ports and according to the mapping configuration as described above with reference to FIGS. 2 through 5. In certain examples, the operations of block 1610 may be performed by the CSI-RS component as described with reference to FIGS. 11 and 12.

Figure 17:
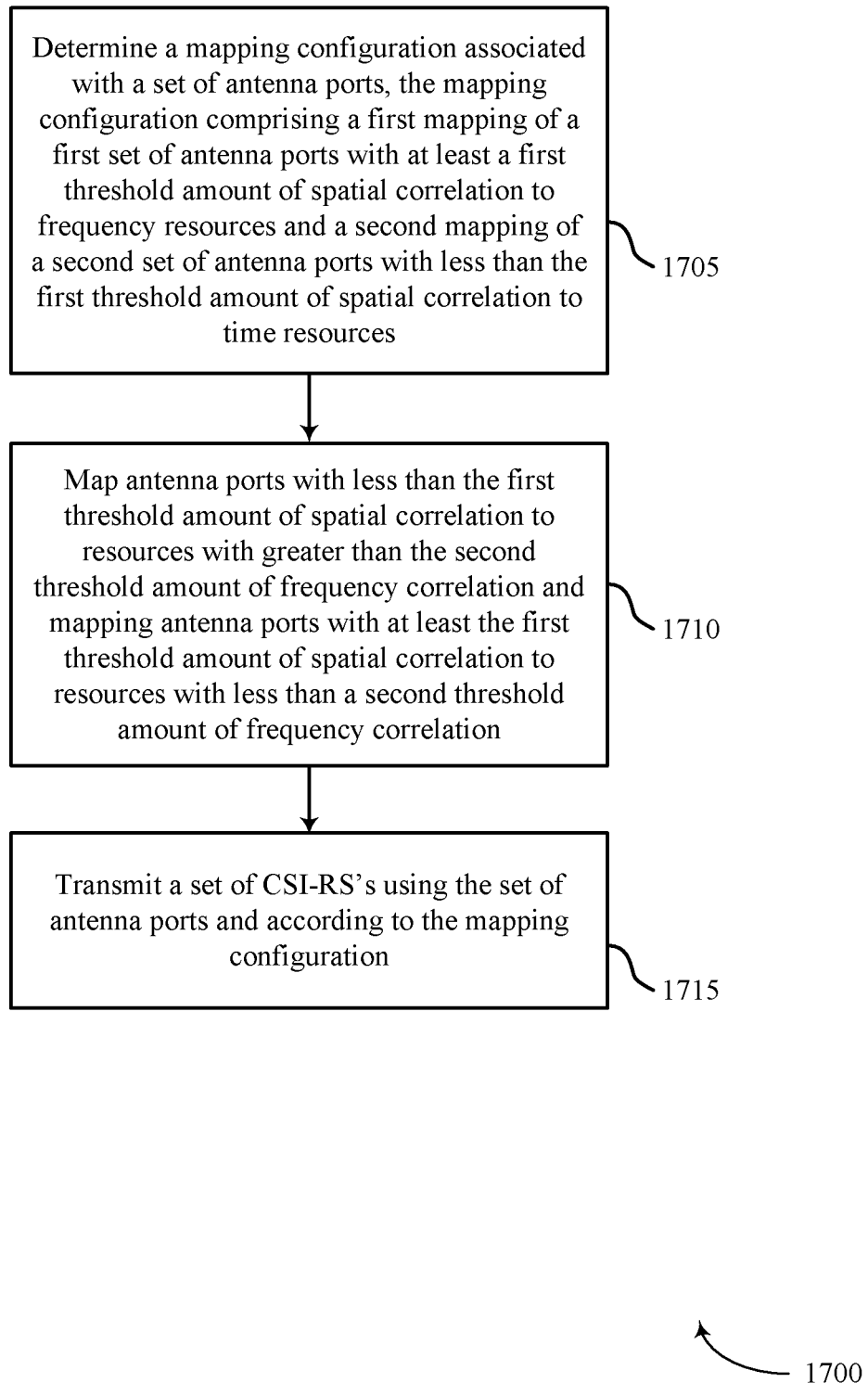

FIG. 17 shows a flowchart illustrating a method 1700 for CSI-RS transmission in accordance with various aspects of the present disclosure. The operations of method 1700 may be implemented by a device such as a base station 105 or its components as described with reference to FIGS. 1 through 3 and 5. For example, the operations of method 1700 may be performed by the base station CSI-RS manager as described herein. In some examples, the base station 105 may execute a set of codes to control the functional elements of the device to perform the functions described below. Additionally or alternatively, the base station 105 may perform aspects the functions described below using special-purpose hardware.

At block 1705, the base station 105 may determine a mapping configuration associated with a set of antenna ports, the mapping configuration including a first mapping of a first set of antenna ports with at least a first threshold amount of spatial correlation to frequency resources and a second mapping of a second set of antenna ports with less than the first threshold amount of spatial correlation to time resources as described above with reference to FIGS. 2 through 5. In certain examples, the operations of block 1705 may be performed by the mapping configuration component as described with reference to FIGS. 11 and 12.

At block 1710, the base station 105 may map antenna ports with less than the first threshold amount of spatial correlation to resources with greater than the second threshold amount of frequency correlation as described above with reference to FIGS. 2 through 5. In some cases, mapping the antenna ports includes: mapping antenna ports with at least the first threshold amount of spatial correlation to resources with less than a second threshold amount of frequency correlation. In certain examples, the operations of block 1710 may be performed by the port mapping component as described with reference to FIGS. 11 and 12.

At block 1715, the base station 105 may transmit a set of CSI-RSs using the set of antenna ports and according to the mapping configuration as described above with reference to FIGS. 2 through 5. In certain examples, the operations of block 1715 may be performed by the CSI-RS component as described with reference to FIGS. 11 and 12.

Figure 18:
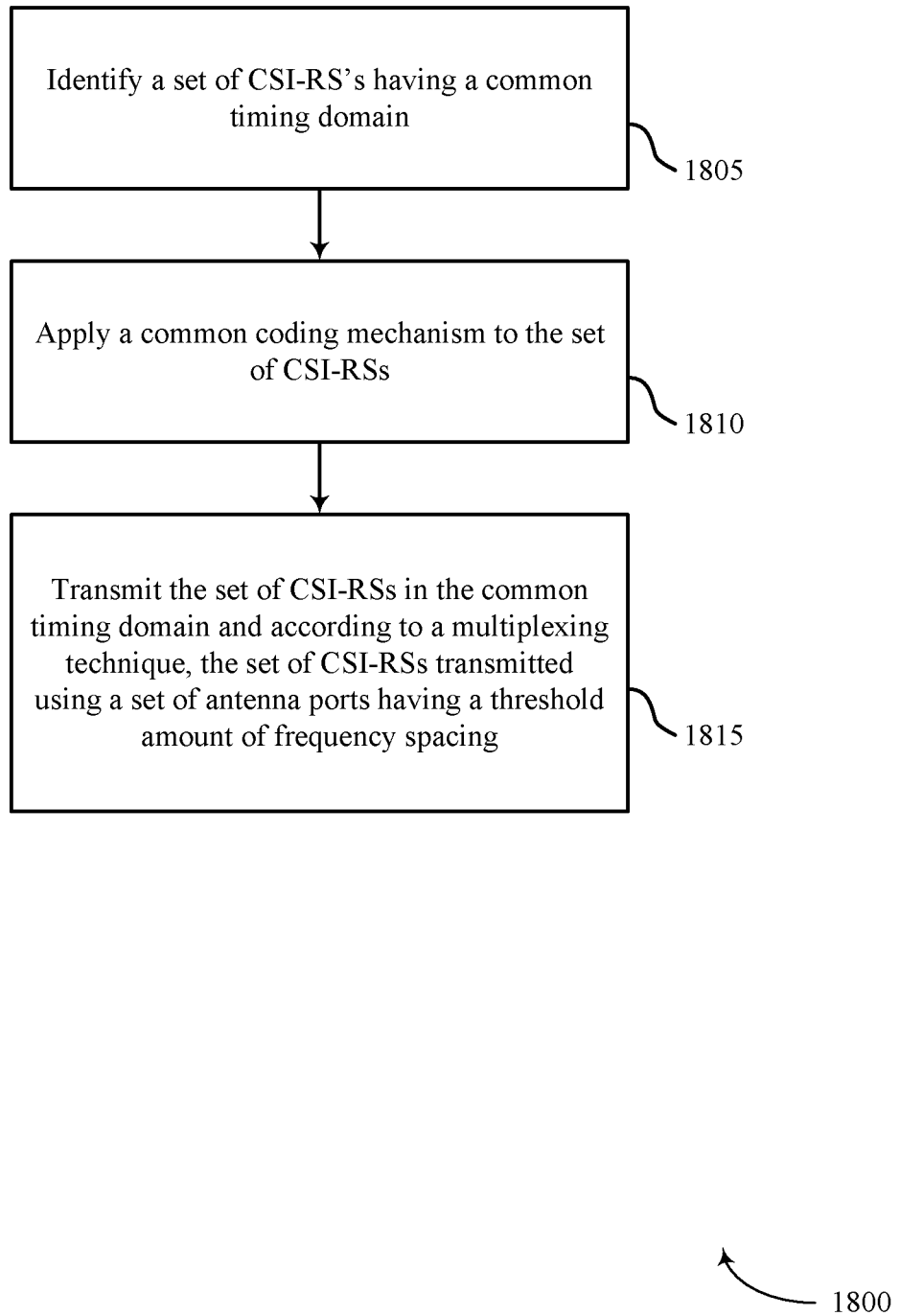

FIG. 18 shows a flowchart illustrating a method 1800 for CSI-RS transmission in accordance with various aspects of the present disclosure. The operations of method 1800 may be implemented by a device such as a base station 105 or its components as described with reference to FIGS. 1 through 3 and 5. For example, the operations of method 1800 may be performed by the base station CSI-RS manager as described herein. In some examples, the base station 105 may execute a set of codes to control the functional elements of the device to perform the functions described below. Additionally or alternatively, the base station 105 may perform aspects the functions described below using special-purpose hardware.

At block 1805, the base station 105 may identify a set of CSI-RSs having a common timing domain as described above with reference to FIGS. 2 through 5. In certain examples, the operations of block 1805 may be performed by the timing domain component as described with reference to FIGS. 11 and 12.

At block 1810, the base station 105 may apply a common coding mechanism to the set of CSI-RSs as described above with reference to FIGS. 2 through 5. In certain examples, the operations of block 1810 may be performed by the coding component as described with reference to FIGS. 11 and 12.

At block 1815, the base station 105 may transmit the set of CSI-RSs in the common timing domain and according to a multiplexing technique, the set of CSI-RSs transmitted using a set of antenna ports having a threshold amount of frequency spacing as described above with reference to FIGS. 2 through 5. In certain examples, the operations of block 1815 may be performed by the CSI-RS component as described with reference to FIGS. 11 and 12.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for CSI-RS transmission.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair. DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO. High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE. LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources).

Frame structures may be defined for FDD (e.g., frame structure type 1) and TDD (e.g., frame structure type 2).

Thus, aspects of the disclosure may provide for CSI-RS transmission. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
   receiving a plurality of channel state information reference signals (CSI-RSs) from a transmitting device, the plurality of CSI-RSs received according to a mapping configuration of the transmitting device that comprises a first mapping of a first set of antenna ports with at least a first threshold amount of spatial correlation to frequency resources with less than a second threshold amount of frequency correlation and a second mapping of a second set of antenna ports with less than the first threshold amount of spatial correlation to time resources and to frequency resources with greater than the second threshold amount of frequency correlation, the plurality of CSI-RSs from the transmitting device using the first set of antenna ports and the second set of antenna ports according to the mapping configuration;
   identifying a joint correlation metric for a channel associated with the plurality of CSI-RSs, the joint correlation metric based at least in part on a frequency correlation and a spatial correlation of the channel; and
   determining a channel estimate for the channel based on the joint correlation metric.
2. The method of claim 1, wherein determining the channel estimate comprises:
   performing joint processing on the plurality of CSI-RSs received across the plurality of antenna ports.
3. The method of claim 2, wherein the joint processing is performed across a plurality of resource blocks (RBs).
4. The method of claim 3, wherein the joint processing comprises:
   identifying the joint correlation metric based on the plurality of CSI-RSs, a reference signal, or combinations thereof.
5. A method of wireless communication comprising:
   determining a mapping configuration associated with a plurality of antenna ports, the mapping configuration comprising a first mapping of a first set of antenna ports with at least a first threshold amount of spatial correlation to frequency resources with less than a second amount of frequency correlation and a second mapping of a second set of antenna ports with less than the first threshold amount of spatial correlation to time resources and to frequency resources with greater than the second threshold amount of frequency correlation; and
   transmitting a plurality of channel state information reference signals (CSI-RSs) using the plurality of antenna ports and according to the mapping configuration.
6. The method of claim 5, further comprising:
   assigning at least a portion of the antenna ports of the first set or the second set of antenna ports to frequencies separated within a predefined range, the assigning based at least in part on a frequency correlation associated with the at least a portion of the antenna ports, the frequency correlation being less than the second threshold amount.
7. The method of claim 5, further comprising:
   assigning at least a portion of the antenna ports of the first set or the second set of antenna ports to frequencies separated outside a predefined range, the assigning based at least in part on a frequency correlation associated with the at least a portion of the antenna ports, the frequency correlation being greater than the second threshold amount.
8. The method of claim 5, further comprising:
   applying a coding mechanism to at least a portion of the CSI-RSs prior to transmission; and
   mapping the coded portion of the CSI-RSs for transmission on antenna ports with low spatial correlation.
9. The method of claim 8, wherein the coding mechanism is applied in a time domain resource, a frequency domain resource, or combinations thereof.
10. The method of claim 8, wherein the antenna ports with low spatial correlation are cross-polarized antenna ports.
11. The method of claim 5, wherein mapping the antenna ports comprises:
    mapping cross-polarized antenna ports to adjacent time domain symbols; and
    mapping co-polarized antenna ports to adjacent frequency domain symbols.
12. A method of wireless communication comprising:
    identifying a plurality of channel state information reference signals (CSI-RSs) having a common timing domain;
    determining a mapping configuration associated with a plurality of antenna ports, the mapping configuration comprising a first mapping of a first set of antenna ports with at least a first threshold amount of spatial correlation to frequency resources with less than a second threshold amount of frequency correlation and a second mapping of a second set of antenna ports with less than the first threshold amount of spatial correlation to time resources and to frequency resources with greater than the second threshold amount of frequency correlation;

applying a common coding mechanism to the plurality of CSI-RSs; and transmitting the plurality of CSI-RSs in the common timing domain and according to a multiplexing technique, the plurality of CSI-RSs transmitted using the plurality of antenna ports having a threshold amount of frequency spacing and according to the mapping configuration.

13. The method of claim 12, wherein the common coding mechanism comprises at least one of a discrete Fourier transform (DFT) code or a Walsh code.

14. The method of claim 12, wherein the multiplexing technique comprises a time division multiplexing (TDM) technique, a frequency division multiplexing (FDM) technique, or combinations thereof.

15. An apparatus for wireless communication, comprising:

means for receiving a plurality of channel state information reference signals (CSI-RSs) from a transmitting device, the plurality of CSI-RSs received according to a mapping configuration of the transmitting device that comprises a first mapping of a first set of antenna ports with at least a first threshold amount of spatial correlation to frequency resources with less than a second threshold amount of frequency correlation and a second mapping of a second set of antenna ports with less than the first threshold amount of spatial correlation to time resources and to frequency resources with greater than the second threshold amount of frequency correlation, the plurality of CSI-RSs from the transmitting device using the first set of antenna ports and the second set of antenna ports according to the mapping configuration;

means for identifying a joint correlation metric for a channel associated with the plurality of CSI-RSs, the joint correlation metric based at least in part on a frequency correlation and a spatial correlation of the channel; and means for determining a channel estimate for the channel based on the joint correlation metric.

16. The apparatus of claim 15, wherein:
determining the channel estimate comprises: performing joint processing on the plurality of CSI-RSs received across the plurality of antenna ports.

17. The apparatus of claim 16, wherein:
the joint processing is performed across a plurality of resource blocks (RBs).

18. The apparatus of claim 17, wherein:
the joint processing comprises: identifying the joint correlation metric based on the plurality of CSI-RSs, a reference signal, or combinations thereof.

19. An apparatus for wireless communication, comprising:

means for determining a mapping configuration associated with a plurality of antenna ports, the mapping configuration comprising a first mapping of a first set of antenna ports with at least a first threshold amount of spatial correlation to frequency resources with less than a second amount of frequency correlation and a second mapping of a second set of antenna ports with less than the first threshold amount of spatial correlation to time resources and to frequency resources with greater than the second threshold amount of frequency correlation; and means for transmitting a plurality of channel state information reference signals (CSI-RSs) using the plurality of antenna ports and according to the mapping configuration.

20. The apparatus of claim 19, further comprising:
means for assigning at least a portion of the antenna ports of the first set or the second set of antenna ports to frequencies separated within a predefined range, the assigning based at least in part on a frequency correlation associated with the at least a portion of the antenna ports, the frequency correlation being less than the second threshold amount.

21. The apparatus of claim 19, further comprising:
means for assigning at least a portion of the antenna ports of the first set or the second set of antenna ports to frequencies separated outside a predefined range, the assigning based at least in part on a frequency correlation associated with the at least a portion of the antenna ports, the frequency correlation being greater than the second threshold amount.

22. The apparatus of claim 19, further comprising:
means for applying a coding mechanism to at least a portion of the CSI-RSs prior to transmission; and
means for mapping the coded portion of the CSI-RSs for transmission on antenna ports with low spatial correlation.

23. The apparatus of claim 22, wherein:
the coding mechanism is applied in a time domain resource, a frequency domain resource, or combinations thereof.

24. The apparatus of claim 22, wherein:
the antenna ports with low spatial correlation are cross-polarized antenna ports.

25. The apparatus of claim 19, wherein:
mapping the antenna ports comprises: mapping cross-polarized antenna ports to adjacent time domain symbols; and
the apparatus further comprising means for mapping co-polarized antenna ports to adjacent frequency domain symbols.

26. An apparatus for wireless communication, comprising:

means for identifying a plurality of channel state information reference signals (CSI-RSs) having a common timing domain;

means for determining a mapping configuration associated with a plurality of antenna ports, the mapping configuration comprising a first mapping of a first set of antenna ports with at least a first threshold amount of spatial correlation to frequency resources with less than a second amount of frequency correlation and a second mapping of a second set of antenna ports with less than the first threshold amount of spatial correlation to time resources and to frequency resources with greater than the second threshold amount of frequency correlation;

means for applying a common coding mechanism to the plurality of CSI-RSs; and means for transmitting the plurality of CSI-RSs in the common timing domain and according to a multiplexing technique, the plurality of CSI-RSs transmitted using the plurality of antenna ports having a threshold amount of frequency spacing and according to the mapping configuration.

27. The apparatus of claim 26, wherein:
the common coding mechanism comprises at least one of a discrete Fourier transform (DFT) code or a Walsh code.

28. The apparatus of claim 26, wherein:
the multiplexing technique comprises a time division multiplexing (TDM) technique, a frequency division multiplexing (FDM) technique, or combinations thereof.

29. An apparatus for wireless communication, in a system comprising:
a processor;
memory in electronic communication with the processor; and
instructions stored in the memory and operable, when executed by the processor, to cause the apparatus to:
receive a plurality of channel state information reference signals (CSI-RSs) from a transmitting device, the plurality of CSI-RSs received according to a mapping configuration of the transmitting device that comprises a first mapping of a first set of antenna ports with at least a first threshold amount of spatial correlation to frequency resources with less than a second threshold amount of frequency correlation and a second mapping of a second set of antenna ports with less than the first threshold amount of spatial correlation to time resources and to frequency resources with greater than the second threshold amount of frequency correlation, the plurality of CSI-RSs from the transmitting device using the first set of antenna ports and the second set of antenna ports according to the mapping configuration;
identify a joint correlation metric for a channel associated with the plurality of CSI-RSs, the joint correlation metric based at least in part on a frequency correlation and a spatial correlation of the channel; and
determine a channel estimate for the channel based on the joint correlation metric.

30. The apparatus of claim 29, wherein:
determining the channel estimate comprises: performing joint processing on the plurality of CSI-RSs received across the plurality of antenna ports.

31. The apparatus of claim 30, wherein:
the joint processing is performed across a plurality of resource blocks (RBs).

32. The apparatus of claim 31, wherein:
the joint processing comprises: identifying the joint correlation metric based on the plurality of CSI-RSs, a reference signal, or combinations thereof.

33. An apparatus for wireless communication, in a system comprising:
a processor;
memory in electronic communication with the processor; and
instructions stored in the memory and operable, when executed by the processor, to cause the apparatus to:
determine a mapping configuration associated with a plurality of antenna ports, the mapping configuration comprising a first mapping of a first set of antenna ports with at least a first threshold amount of spatial correlation to frequency resources with less than a second threshold amount of frequency correlation and a second mapping of a second set of antenna ports with less than the first threshold amount of spatial correlation to time resources and to frequency resources with greater than the second threshold amount of frequency correlation; and
transmit a plurality of channel state information reference signals (CSI-RSs) using the plurality of antenna ports and according to the mapping configuration.

34. The apparatus of claim 33, wherein the instructions are further executable by the processor to:
assign at least a portion of the antenna ports of the first set or the second set of antenna ports to frequencies separated within a predefined range, the assigning based at least in part on a frequency correlation associated with the at least a portion of the antenna ports, the frequency correlation being less than the second threshold amount.

35. The apparatus of claim 33, wherein the instructions are further executable by the processor to:
assign at least a portion of the antenna ports of the first set or the second set of antenna ports to frequencies separated outside a predefined range, the assigning based at least in part on a frequency correlation associated with the at least a portion of the antenna ports, the frequency correlation being greater than the second threshold amount.

36. The apparatus of claim 33, wherein the instructions are further executable by the processor to:
apply a coding mechanism to at least a portion of the CSI-RSs prior to transmission; and
map the coded portion of the CSI-RSs for transmission on antenna ports with low spatial correlation.

37. The apparatus of claim 36, wherein:
the coding mechanism is applied in a time domain resource, a frequency domain resource, or combinations thereof.

38. The apparatus of claim 36, wherein:
the antenna ports with low spatial correlation are cross-polarized antenna ports.

39. The apparatus of claim 33, wherein:
mapping the antenna ports comprises: mapping cross-polarized antenna ports to adjacent time domain symbols; and
the instructions are further executable to map co-polarized antenna ports to adjacent frequency domain symbols.

40. An apparatus for wireless communication, in a system comprising:
a processor:
memory in electronic communication with the processor; and
instructions stored in the memory and operable, when executed by the processor, to cause the apparatus to:
identify a plurality of channel state information reference signals (CSI-RSs) having a common timing domain;
determine a mapping configuration associated with a plurality of antenna ports, the mapping configuration comprising a first mapping of a first set of antenna ports with at least a first threshold amount of spatial correlation to frequency resources with less than a second threshold amount of frequency correlation and a second mapping of a second set of antenna ports with less than the first threshold amount of spatial correlation to time resources and to frequency resources with greater than the second threshold amount of frequency correlation;
apply a common coding mechanism to the plurality of CSI-RSs; and
transmit the plurality of CSI-RSs in the common timing domain and according to a multiplexing technique, the plurality of CSI-RSs transmitted using a the plurality of antenna ports having a threshold amount of frequency spacing and according to the mapping configuration.

41. The apparatus of claim 40, wherein:
the common coding mechanism comprises at least one of a discrete Fourier transform (DFT) code or a Walsh code.

42. The apparatus of claim 40, wherein:
the multiplexing technique comprises a time division multiplexing (TDM) technique, a frequency division multiplexing (FDM) technique, or combinations thereof.

43. A non-transitory computer-readable medium storing code for wireless communication, the code comprising instructions executable by a processor to:
receive a plurality of channel state information reference signals (CSI-RSs) from a transmitting device, the plurality of CSI-RSs received according to a mapping configuration of the transmitting device that comprises a first mapping of a first set of antenna ports with at least a first threshold amount of spatial correlation to frequency resources with less than a second threshold amount of frequency correlation and a second mapping of a second set of antenna ports with less than the first threshold amount of spatial correlation to time resources and to frequency resources with greater than the second threshold amount of frequency correlation, the plurality of CSI-RSs from the transmitting device using the first set of antenna ports and the second set of antenna ports according to the mapping configuration;
identify a joint correlation metric for a channel associated with the plurality of CSI-RSs, the joint correlation metric based at least in part on a frequency correlation and a spatial correlation of the channel; and
determine a channel estimate for the channel based on the joint correlation metric.

44. The non-transitory computer-readable medium of claim 43, wherein:
determining the channel estimate comprises: performing joint processing on the plurality of CSI-RSs received across the plurality of antenna ports.

45. The non-transitory computer-readable medium of claim 44, wherein:
the joint processing is performed across a plurality of resource blocks (RBs).

46. The non-transitory computer-readable medium of claim 45, wherein:
the joint processing comprises: identifying the joint correlation metric based on the plurality of CSI-RSs, a reference signal, or combinations thereof.

47. A non-transitory computer-readable medium storing code for wireless communication, the code comprising instructions executable by a processor to:
determine a mapping configuration associated with a plurality of antenna ports, the mapping configuration comprising a first mapping of a first set of antenna ports with at least a first threshold amount of spatial correlation to frequency resources with less than a second threshold amount of frequency correlation and a second mapping of a second set of antenna ports with less than the first threshold amount of spatial correlation to time resources and to frequency resources with greater than the second threshold amount of frequency correlation; and
transmit a plurality of channel state information reference signals (CSI-RSs) using the plurality of antenna ports and according to the mapping configuration.

48. The non-transitory computer-readable medium of claim 47, wherein the instructions are further executable by the processor to:
assign at least a portion of the antenna ports of the first set or the second set of antenna ports to frequencies separated within a predefined range, the assigning based at least in part on a frequency correlation associated with the at least a portion of the antenna ports, the frequency correlation being less than the second threshold amount.

49. The non-transitory computer-readable medium of claim 47, wherein the instructions are further executable by the processor to:
assign at least a portion of the antenna ports of the first set or the second set of antenna ports to frequencies separated outside a predefined range, the assigning based at least in part on a frequency correlation associated with the at least a portion of the antenna ports, the frequency correlation being greater than the second threshold amount.

50. The non-transitory computer-readable medium of claim 47, wherein the instructions are further executable by the processor to:
apply a coding mechanism to at least a portion of the CSI-RSs prior to transmission; and
map the coded portion of the CSI-RSs for transmission on antenna ports with low spatial correlation.

51. The non-transitory computer-readable medium of claim 50, wherein:
the coding mechanism is applied in a time domain resource, a frequency domain resource, or combinations thereof.

52. The non-transitory computer-readable medium of claim 50, wherein:
the antenna ports with low spatial correlation are cross-polarized antenna.

53. The non-transitory computer-readable medium of claim 47, wherein:
mapping the antenna ports comprises: mapping cross-polarized antenna ports to adjacent time domain symbols; and
the instructions are further executable to map co-polarized antenna ports to adjacent frequency domain symbols.

54. A non-transitory computer-readable medium storing code for wireless communication, the code comprising instructions executable by a processor to:
identify a plurality of channel state information reference signals (CSI-RSs) having a common timing domain;
determine a mapping configuration associated with a plurality of antenna ports, the mapping configuration comprising a first mapping of a first set of antenna ports with at least a first threshold amount of spatial correlation to frequency resources with less than a second threshold amount of frequency correlation and a second mapping of a second set of antenna ports with less than the first threshold amount of spatial correlation to time resources and to frequency resources with greater than the second threshold amount of frequency correlation;
apply a common coding mechanism to the plurality of CSI-RSs; and
transmit the plurality of CSI-RSs in the common timing domain and according to a multiplexing technique, the plurality of CSI-RSs transmitted using the plurality of antenna ports having a threshold amount of frequency spacing and according to the mapping configuration.

55. The non-transitory computer-readable medium of claim 54, wherein:
the common coding mechanism comprises at least one of a discrete Fourier transform (DFT) code or a Walsh code.

56. The non-transitory computer-readable medium of claim 54, wherein:

the multiplexing technique comprises a time division multiplexing (TDM) technique, a frequency division multiplexing (FDM) technique, or combinations thereof.

* * * * *